US00RE36157E

United States Patent [19]

Robbins et al.

[11] E Patent Number: Re. 36,157

[45] Reissued Date of Patent: Mar. 23, 1999

[54] METHODS OF MANUFACTURE OF IMPROVED LINEAR OPTICAL CONDUITS

[75] Inventors: John A. Robbins, Lake Forest; James R. Zarian, now by change of name from Jamshid J. Zarian; Sandford R. Willford, both of Newport Beach, all of Calif.

[73] Assignee: Lumenyte International Corp., Irvine, Calif.

[21] Appl. No.: 701,199

[22] Filed: Aug. 21, 1996

Related U.S. Patent Documents

Reissue of:

[64] Patent No.: 5,221,387
Issued: Jun. 22, 1993
Appl. No.: 789,610
Filed: Nov. 6, 1991

U.S. Applications:

[60] Continuation of Ser. No. 493,256, Jun. 21, 1995, abandoned, which is a division of Ser. No. 446,011, Dec. 13, 1989, Pat. No. 5,067,831, which is a continuation-in-part of Ser. No. 304,417, Jan. 30, 1989, Pat. No. 4,957,347.

[51] Int. Cl.[6] ..... B32B 31/26

[52] U.S. Cl. ..... 156/85; 156/86; 156/244.11; 156/244.12; 156/244.24; 156/296; 156/304.2; 264/230; 264/271.1; 264/279.1; 264/342 R; 264/DIG. 71; 385/42; 385/52; 385/53; 385/91; 385/102; 385/123; 385/125

[58] Field of Search ..... 156/85, 86, 244.24, 156/296, 244.12, 244.11, 304.2; 264/1.29, 1.28, 271.1, 279.1, 230, 342 R, DIG. 71; 385/42, 52, 53, 91, 102, 123, 125; 362/32

[56] References Cited

U.S. PATENT DOCUMENTS 3,641,332 2/1972 Reick et al. .
3,646,186 2/1972 Hager ..... 264/1.28 X (List continued on next page.)

FOREIGN PATENT DOCUMENTS 0 112 564 12/1983 European Pat. Off. .
2 845 887 10/1978 Germany .
57-45502 3/1982 Japan .
60-42712 3/1985 Japan .

OTHER PUBLICATIONS

Fiberstars, Inc. brochure entitled "Even-Glo Fiber Optic Pool/Spa Lighting System Installation Manual", pp. 1–10, dated Jan. 24, 1990.
Fiberstars, Inc. brochure entitled "Accent Your Curves", pp. 1–2, date unknown but believed to be 1987.
Fiberstars, Inc. brochure entitled "Lighting for the 21st Century", pp. 1–4, 1988.

(List continued on next page.)

*Primary Examiner*—Jeff H. Aftergut
*Attorney, Agent, or Firm*—Small Larkin, LLP

[57] ABSTRACT

The present invention is directed to a heat shrink clad core optical conduit and to an optical conduit having either a thermoplastic, thermoset or liquid, light transmitting core surrounded by, preferably a fluoropolymer cladding which is in turn surrounded by a tight-fitting, finish polymer jacket which may be either transparent or translucent, and is preferably made of a polyvinyl chloride, polycarbonate, acrylic or silicone material. Numerous fillers and inserts may be used in the finish jacket polymer and the finish jacket polymer may be formed into various shapes. Bondable jacket materials may be used. The preferred method of forming the manufacturing jacket around a heat shrinkable fluoropolymer cladding is by extruding a low extrusion temperature polymer over a heat shrink clad in its expanded form into which an increased interior pressure is maintained to prevent shrinkage during the extrusion process. The preferred method of forming the finish jacket around a base clad core material is by an extrusion process where the finish jacket material is extruded over a heat shrink type fluoropolymer clad, in its expanded form, cured thermoset core thereby simultaneously shrinking the clad.

45 Claims, 5 Drawing Sheets

U.S. PATENT DOCUMENTS

| | | | |
|---|---|---|---|
| 3,810,802 | 5/1974 | Buhite et al. . | |
| 3,919,037 | 11/1975 | Miller . | |
| 4,172,106 | 10/1979 | Lewis | 264/1.29 X |
| 4,195,980 | 4/1980 | Sterling . | |
| 4,261,936 | 4/1981 | Hartig | 264/1.28 X |
| 4,422,719 | 12/1983 | Orcut | 362/32 X |
| 4,466,697 | 8/1984 | Daniel | 264/1.24 X |
| 4,753,509 | 6/1988 | Parstorfer . | |
| 4,763,984 | 8/1988 | Awai et al. | 362/32 X |
| 4,804,246 | 2/1989 | Kobayashi et al. . | |
| 4,828,359 | 5/1989 | Ueba et al. | 264/1.29 X |
| 4,844,578 | 7/1989 | Pierini et al. . | |
| 4,865,412 | 9/1989 | Patterson . | |
| 4,907,133 | 3/1990 | Nath | 362/32 |
| 4,919,851 | 4/1990 | Coutandin et al. | 264/230 X |
| 4,933,815 | 6/1990 | Parthasarathy | 362/32 |
| 4,936,651 | 6/1990 | Tani . | |
| 4,957,347 | 9/1990 | Zarian . | |
| 5,052,778 | 10/1991 | Jamshid . | |
| 5,067,831 | 11/1991 | Robbins et al. . | |

OTHER PUBLICATIONS

Fiberstars, Inc. brochure entitled "Fiber Optic Underwater and Perimeter Pool and Spa Lighting Systems and New Fiber Optic Landscape Lighting Fixture Installation Manual", pp. 1–20, dated Dec. 8, 1993.

Abstract of Title and Assignment in re to U.S. Patent No. 4,763,984.

Manufacturing Jackets Known In The Prior Art: Selected excerpts from U.S. Patent No. 5,221,387 disclosing conventional manufacturing jackets.

FIG. 1.
PRIOR ART
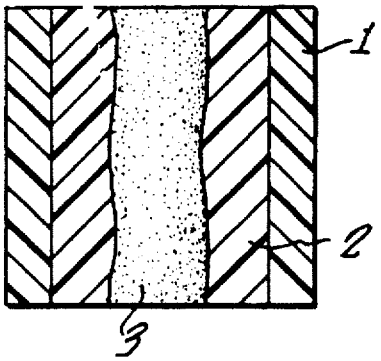
FIG. 2.
PRIOR ART
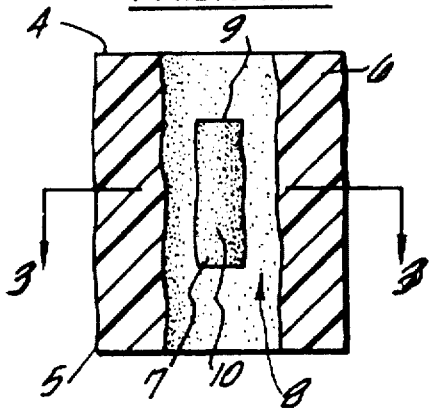
FIG. 3.
PRIOR ART
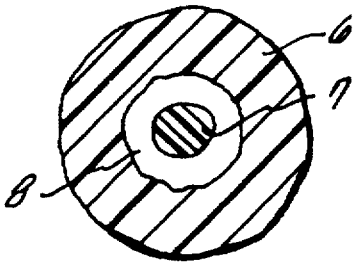
FIG. 4.
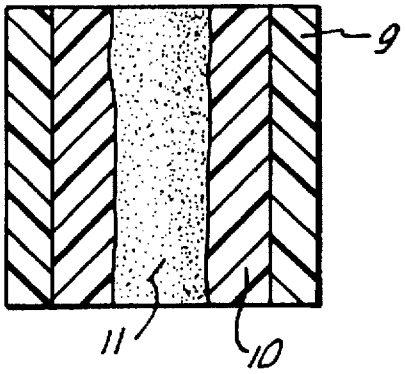
FIG. 5.
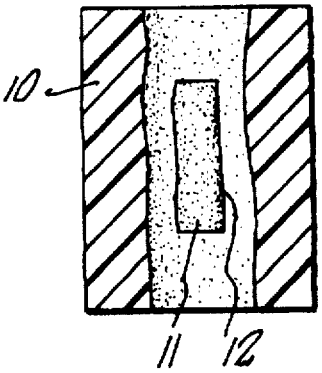
FIG. 6.
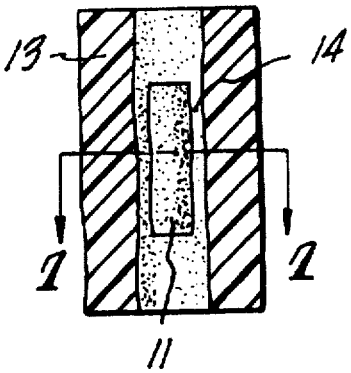
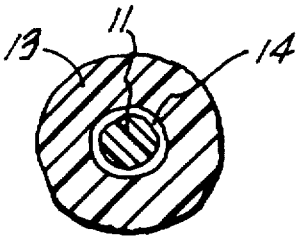
FIG. 7.

METHODS OF MANUFACTURE OF IMPROVED LINEAR OPTICAL CONDUITS

Matter enclosed in heavy brackets [ ] appears in the original patent but forms no part of this reissue specification; matter printed in italics indicates the additions made by reissue.

[This is a divisional of copending application Ser. No. 07/446,011, filed Dec. 13, 1989, now U.S. Pat. No. 5,067,831, which was a continuation-in-part of Ser. No. 07/304,417, filed Jan. 30, 1989, now U.S. Pat. No. 4,957,347.]*This application is a continuation of application Ser. No. 08/493,256, filed on Jun. 21, 1995, now abandoned, which is a reissue application of Ser. No. 07/789,610, filed Nov. 6, 1991, and issued as U.S. Pat. No. 5,221,387, which is a divisional application of Ser. No. 07/446,011, filed Dec. 13, 1989, and issued as U.S. Pat. No. 5,067,831, which is a continuation-in-part application of Ser. No. 07/304,417, filed on Jan. 30, 1989, and issued as U.S. Pat. No. 4,957,347.*

FIELD OF THE INVENTION

The present invention relates to improved clad optical conduits, systems and methods of production therefor.

Improved optical conduit and methods of manufacture of the present invention include cylindrical light emitting conduits which emit light from their outer circumferential surface in a more optically efficient manner, with a greater light intensity and in a more uniform manner than previously known. Optical efficiency refers to the ratio of light output to light input for a given tube length and cross section.

The present invention includes clad optical conduits in which a glass, liquid or polymeric core having a relatively high refractive index is surrounded by a cladding of a relatively low refractive index and a gap therebetween is minimized.

The present invention also relates to improved optical light forms, systems and methods of manufacture, and specifically to single or multiple linear illumination optical conduits having a light transmitting core and a fluoropolymer cladding which are tightly jacketed with a sheathing of transparent or translucent material such as acrylic, polycarbonate, polyvinyl chloride or silicone polymer.

The improved optical conduit and system of the present invention incorporate many of the attributes of the commonly used linear light forms such as neon, fluorescent, tube lighting and conventional thermoset, thermoplastic and liquid core optical conduit, while eliminating or greatly reducing many of the problems associated with those linear light forms. The present invention is suitable for virtually all currently known uses of these conventional linear light forms. The improved thermoset, thermoplastic or liquid core linear light forms of the present invention provides numerous advantages as will hereinafter be described in detail.

Conventional linear light forms within the field of the invention may be classified into two general types. The first type of linear lighting forms are the true linear lights, i.e., those in which the source of the light is contained within the light form envelope. Examples of linear lights include neon lights, fluorescent and cold cathode lights, reflective fluorescent lights and tube lighting. The second type of linear light forms are the optical conduits, i.e., those in which the source of illumination is external to the envelope, so that the optical conduit functions to conduct and transmit the light generated by an external source. Examples of linear optical conduit include thermoplastic or thermoset core optical conduit having fluoropolymer cladding, liquid core optical conduit and the improved optical conduit of the present invention. Although preferred embodiments of the present invention are directed to thermoset core optical conduit(s), the principles of the present invention also may be used in conjunction with thermoplastic core and liquid core optical conduit(s).

The methods of manufacture of each of the conventional linear light forms differ from light form to light form, as is well known.

The preferred method of manufacturing the optical conduit of the present invention includes tightly extruding a finish jacket material upon the heat shrunk fluoropolymer clad, cured thermoset or thermoplastic core. Other methods of tightly jacketing the optical conduit are available. The method of manufacture of the present invention provides advantages as will be hereinafter described in detail.

STATE OF THE ART

Linear light forms have been known for many years and are widely accepted as practical lighting products for such uses as sign letters; outlining on buildings; decorative art forms; pool and spa perimeter and underwater lighting; warning signals; aisle lighting; fountain lighting; special effects; landscape lighting; and general illumination.

The term linear light form as used herein refers to both conventional linear light forms and to the linear light conduit (s) of the present invention in that these light forms have their greatest dimension in length, and thus appear typically as a line, or some other shape having a length dimension greater than a width, height, or diameter dimension. Well known examples of conventional forms include neon signs, fluorescent types, tube lighting, and Eska brand and Lumenyte brand optical conduit(s).

Generally, the term optical conduit as used in this specification refers to the fact that the conduit includes a core which is sheathed with a cladding and the composition of the core and cladding conduct, or transmit, light or electromagnetic energy ranging from the infrared through the visible to and including the ultraviolet region of the electromagnetic spectrum by the principal of "Total Internal Reflection", as is well known to those skilled in this art.

Optical conduits are commonly referred to as "fiber optics" or "optical fibers". Fiber optics encompass three distinctly different types of functions, namely; telecommunications, coherencies and illumination. Telecommunication fiber optics are used in telephone communication to transmit light from a source to a remote point. Coherent functions involve transmission of a visible image along a bundle of flexible fiber optic conduits to a remote point by grouping a multiplicity of individual optical fibers in such a manner that the placement of the fibers relative one to the others, at the remote point of sight reception is exactly that of the placement of the ends of the fibers relative one to the others at the source point of the image of the object which is being transmitted.

Both telecommunication and coherent fiber optics are considered point lights, and emission of light out of the sides of the optical conduit is to be avoided.

Illumination fiber optics have two separate functions of illumination: one being "point lighting", i.e., where the primary function of the fiber optic is to provide a means of conducting the light from a light source to a remote point and emitting the light from the end, and other being "linear lighting", i.e., wherein the primary function of the fiber optic is to provide a means of conducting light from a light source linearly along the length of the fiber optic and emitting the light from the sides of the fiber optic.

The present invention is directed to illumination fiber optics, and in particular, to the linear lighting function.

In order to better understand the nature of, and improvements to the state of the art resulting from the present invention, a short description of known linear light forms and the associated problems are set forth below:

Neon Lights

Neon lights have been in existence for many years and are presently widely used and accepted as practical lighting products. They are used primarily as a decorative art form, for back lighting sign letters, for outlining buildings, and for other creative uses.

Neon is fabricated from glass which has been extruded by conventional glass extrusion techniques into tubular shapes of various diameters and are typically limited to standard lengths. The glass tubing, after evacuation, is filled with a gas, typically neon. During operation, the gas is activated by electrical current, which excites the gas to then produce light in a well known manner.

The tubes used in neon lights are typically made of one of two types of glass: either "soft glass" which is also known as soda lime, or hard glass which is known as Pyrex™ glass. The soft glass can be bent when the glass reaches a temperature of about 300° C. The harder glass requires a temperature of about 600° to 800° C. to achieve a softness whereby it can be bent.

The known maximum commercially available length of neon lights is about 60 to 72 feet. However, because of difficulty associated with handling these lengths of glass tubing, neon fabricators generally prefer neon light tubing not to exceed 8 feet in length for one person installation purposes and generally not to exceed 12 foot lengths for two person installation purposes.

Neon linear lighting has been widely used mainly because of four of its attributes: it appears to have an aura, or "glow" emanating radially outwardly from its interior and along its length, is very bright, can exhibit a variety of colors and can be formed into various linear shapes.

There are a number of problems associated with neon lighting products, however. Neon lighting forms are easily broken because the gas is contained within a glass envelope; they must be fabricated at one location and installed in a remote location; they require a relatively high degree of skill in their fabrication; they require a relatively great amount of energy to operate; they cannot change color because the light emitted from the glass tubes are fixed by the choice of the glass color used and the gas used inside of the tubes; they are dangerous to use because of the relatively high voltage required to excite the gas inside the tube and continue production of light; because of the relatively high energy requirements, they are relatively costly to operate; over the long term, they are additionally relatively costly due to high maintenance costs and relatively high replacement costs due to breakage and gas leakage; they cannot be mounted to a surface, such as a wall of a building; they must have "standoffs" to hold them away from the supporting, or backing surface, such as a wall; due to the power requirements of neon lights, special electrical raceways must be used to carry wiring from the power source to the neon light; neon has had very limited use in residential applications because of the relatively high voltage required; because of the associated electrical hazards, neon cannot be used under water or in explosive environments; repair of neon lighting products in the field is relatively difficult; as a practical matter, the maximum length between electrodes of neon tubing is about 8 to 12 feet; and they expose humans to risk of serious injury because of broken glass and the associated electrical hazards.

Fluorescent Cold Cathode Lights

Conventional cold cathode linear lights are approximately one inch in diameter, halophosphorous coated, lead glass tubes which are made by baking the coated tubes with heavy duty, coated, right-angle electrodes embedded therein. Cold cathode linear lights are similar in appearance to fluorescent lighting; however, cold cathode linear lights are low voltage and fluorescent linear lights are high voltage. The color choices of cold cathode and fluorescent linear lights are similar to neon and, as with neon, are fixed with respect to a given light. The gases used inside of the envelope are neon or argon with a mercury amalgam.

Numerous problems are also associated with the use and manufacture of fluorescent and cold cathode linear lights. First, they require very expensive equipment to produce. Second, because of the expense and complexity of the fabrication equipment, fluorescent and cold cathode lights cannot be fabricated at a job site or even in a small shop, such as neon lighting can be fabricated. Third, fluorescent and cold cathode lights must be purchased in prefabricated shapes, thus limiting their versatility. Fourth, cold cathode lighting presently costs about twice what neon lights cost. Fifth, cold cathode lighting products are limited to maximum lengths of about 96 inches. Sixth, fluorescent and cathode lights do not have the aura that neon lighting has. Fluorescent light is used normally as functional illumination. Cold cathode light is used normally as accent or decorative illumination.

Reflective Fluorescent (Black Lighting) Lights

Reflective fluorescent lighting, also commonly known as "black lighting" is a tube or rod made of plastic which glows when exposed to ultraviolet light frequencies. Through conventional extrusion techniques, the rods or tubes can be formed into desired cross-sectional shapes.

Colors vary depending upon the chemical composition of the fluorescing materials used, and are fixed with respect to any chemicals chosen.

There are several limitations associated with black lighting, some of which are listed here. Black lighting must be put into a dark enclosure and exposed to an ultraviolet light source to be seen as a light; it does not have an aura, such as that of neon lighting; and it cannot be used to back-light letters or other shapes because it relies upon reflected light for its effect.

Tube Lighting

Tube lighting is a pseudo linear light form. Although at a distance it can give the appearance of a continuous light, tube lighting actually comprises a length of clear glass or plastic tube which contains a series of evenly spaced lights inside the tube. Tube lighting is made by wiring together lights in a desired length to form a strand and then inserting the strand into a glass or plastic tube. The ends of the wires are terminated with an appropriate connector.

Tube lighting has a unique quality of emitting a "starry" appearance. It can be made flexible or rigid, depending upon the tubing material into which the strands of lights are placed.

Color can be varied by coloring either the lights or the tubing. Once set, however, the color is fixed.

Some of the problems with tube lighting are that the lights and wires used in the strands are very susceptible to damage at joints made between couplings; and changing individual light bulbs is impossible in many instances, and at best is very difficult to perform.

Thermoplastic Optical Conduits

Thermoplastic optical conduits are plastic rods usually made of acrylic, styrene or polycarbonate polymer. These optical rods are usually made in diameters of ⅛th inch or less. Although acrylic polymer is very brittle, the relatively small diameters used allows an appearance of flexibility. The rods transmit light from one end to the other when illuminated from an external light source and exhibit a small amount of light leakage radially outward along their length. Individual thermoplastic optical fibers are commercially available and are made by extrusion. Typically, a number of lengths of finished thermoplastic optical fibers are gathered into a bundle and placed inside of a hollow tube to yield a finished thermoplastic optical fiber. Color variation is established by means of filtering the light at the light source.

There are a number of problems associated with thermoplastic optical fiber, both individually and when grouped together and placed inside of a hollow tube. Some of them are: thermoplastic fibers have a relatively low melting point and thus can be used only with relatively low-intensity light sources; because the light source input is relatively limited, the intensity of light emitted from the individual thermoplastic fibers as well as the aggregate light emitted from fibers bundled inside of a tube is also very limited in comparison to other optical light forms; because the light emitted from the tube is in reality emitted from a number of individual strands of fiber within the tube, the overall effect of the light emission from the tube does not have the even, uniform look as do some other linear light forms; the individual strands within the tube produce a number of shadows and are a unique contribution to its visual non-uniformity; and thermoplastic optical conduit has no aura, as does neon.

Thermoset Optical Conduits

Thermoset optical conduits differ from thermoplastic optical conduits primarily in the nature of the chemical bonding of the polymers used. They are relatively high temperature resistant, flexible, monofilament solid core fiber optics around which is placed a fluoropolymer cladding of about 0.007 to about 0.030 inches in thickness. Transmitted light typically is conducted through an optic and emitted at the end opposite the light source and/or emitted radially along its length. Thermoset optical conduits have been known to have been inserted into relatively loose fitting transparent or translucent tubes, similar to the method of displaying thermoplastic fiber optics. Various linear lighting conduits of this general type and their method of manufacture are described in U.S. Pat. No. 3,641,332 to Frank Reick et al; U.S. Pat. No. 5,122,580 and other such conduits which are commercially available from Lumenyte International Corporation and others.

Conventional, commercially available and as described herein thermoset monofilament optical conduit may be made with a manufacturing jacket of polyethylene or similar thermoplastic as a structural mold within which the thermosetting monomer and the fluoropolymer clad tubing are placed prior to polymerizing the monomer mixture. After polymerization, the manufacturing jacket is removed, the resulting product is a linear, thermoset, monofilament optical conduit having a heat shrunk cladding.

The clad core (heat shrink or non heat shrink type) is relatively transparent and when illuminated produces a side-light effect somewhat similar to that of a neon light, except that it does not have the characteristic aura associated with a neon light. It is noted that the finish jacket of the present invention is different from and should not be confused with the conventional manufacturing jacket.

Thermoset optical conduit also has a number of associated problems. For example, thermoset optical conduit will not hold its shape when bent. The cladding carries a static charge which attracts dust, etc. Thermoset optical conduit is relatively soft and easily scratched in comparison to glass. When inserted into transparent of translucent tubes, uneven light emissions occur, the tubing can cause crimping when bent and it is relatively costly to insert the optical conduit in such tubing. Although thermoset optical conduit can be spliced, there is weakness in the cladding at the splice and "hot spots" of light also result at the splice locations. Thermoset optical conduit is relatively difficult to splice by solvent welding, the typical splicing technique, because of extreme difficulties with solvent welding of FEP Teflon® cladding, the most commonly used type of fluoropolymer used to clad the core material. Thermoset optical conduit has bend-radius limitations which make it relatively difficult to shape into letters or other forms without kinking and without disturbing the quality of light emitted, particularly at the sharper bends. Ultraviolet radiation, such as from exposure to the sun, causes hardening of the core polymer, thus reducing, and in extreme cases, eliminating its flexibility. Illuminated thermoset monofilament optical conduit appears to be relatively transparent and, in some applications, is not desirable. It is relatively difficult to attach thermoset optical conduit to other materials because its cladding surface is made of FEP Teflon® or an equivalent material. Thermoset optical conduit has no aura analogous to that of neon lighting. When water or other fluids penetrate the clad or enter the conduit at either end between the clad and the core, light transmission along the conduit is radically altered, and in most instances is severely degraded. In order to protect or enhance its optical or environmental qualities, thermoset optical conduit cannot, as a practical matter, be made with inclusion of chemical or physical fillers either in the core or in the clad material because the index of refraction of these materials would then be altered and may increase attenuation of light transmitted through the conduit. Methods of mounting thermoset optical fibers are relatively expensive and unattractive because the cladding material cannot easily or economically be made with projections to aid in mounting.

BRIEF DESCRIPTION OF THE DRAWINGS

FIG. 1 is a cross-sectional view of a section of a conventional clad, optical conduit assembly prior to polymerization.

FIG. 2 is a cross-sectional view of a section of a conventional clad, optical conduit assembly after polymerization and removal of the manufacturing jacket.

FIG. 3 is a cross-sectional view of the FIG. 2 clad, optical conduit taken along line 3—3.

FIG. 4 is a cross-sectional view of a section of a clad, optical conduit assembly of the present invention prior to polymerization.

FIG. 5 is a cross-sectional view of a section of a clad, optical conduit assembly of the present invention after polymerization, but prior to application of heat.

FIG. 6 is a cross-sectional view of a section of a clad, optical conduit of the present invention after polymerization, after removal of the manufacturing jacket and after application of heat to shrink the heat shrinkable fluoropolymer cladding.

FIG. 7 is a cross-sectional view of the FIG. 6 clad, optical conduit taken along line 7—7.

OBJECTS OF THE INVENTION

Figure 8:
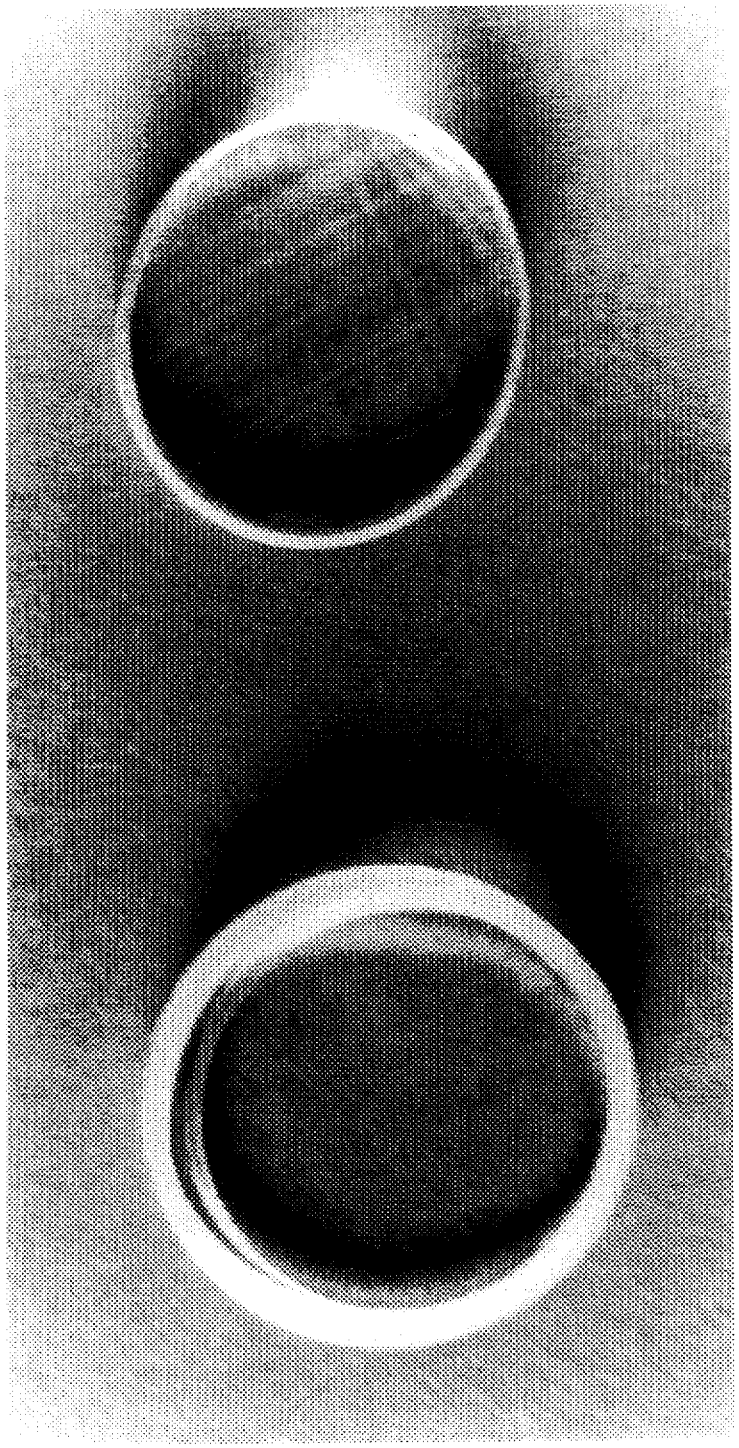
FIG. 8 is a photograph showing a cross-section of a clad, optical conduit as disclosed in Ser. No. 883,350, and a clad, optical conduit of the present invention.

It is an object of the present invention to provide a clad optical conduit having improved optical efficiency.

It is a further object of the present invention to provide a clad, optical conduit having greater light emission from its circumferential periphery for a given light source.

It is a further object of the present invention to provide a clad, optical conduit having relatively uniform light emission distribution from its circumferential periphery even at regions where bends exists.

It is a further object of the present invention to provide a process for manufacture of clad optical conduit having improved optical efficiency properties in bent sections of conduit, in comparison to the optical efficiency properties of known clad optical conduit having the same degree of bending.

It is a further object of the present invention to provide a process for manufacture of a clad, optical conduit having relatively uniform light emission from its outer circumferential periphery.

It is a further object of the present invention to provide a process for the simultaneous manufacture of a plurality of clad, optical conduit having improved optical efficiency.

It is a further object of the present invention to provide a process for the simultaneous manufacture of a plurality of clad, optical conduits each having relatively uniform light emission from its outer circumferential periphery.

It is a further object of the present invention to provide improved optical conduit having improved optical efficiency and uniform light emission properties.

It is a further object of the present invention to provide clad, optical conduit wherein any gap which may exist between the inner core and the outer cladding is minimized.

It is a further object of the present invention to provide clad, optical conduit having a relatively uniform minimized gap between an inner core and an outer cladding.

It is a further object of the present invention to provide a heat shrinkable tube as the clad material on a clad, cylindrical optical conduit.

It is a further object of the present invention to provide a process for the manufacture of clad, optical conduit having a heat shrinkable cladding material and a minimized uniform gap between the inside periphery of a cladding tube and the outside periphery of an inner core.

It is a further object of the present invention to provide an improved linear light form.

It is a further object of the present invention to provide an improved thermoset and/or thermoplastic optical conduit having a relatively flexible, solid light transmitting core, and/or a liquid core light transmitting core, each of which is surrounded by a clad which is tightly surrounded by a transparent or translucent jacket.

It is a further object of the present invention to provide a method for making an improved thermoset, thermoplastic and/or liquid core optical light conduit.

It is a further object of the present invention to provide either a bundle of or a single thermoset, monofilament optical conduit containing a light transmitting polymeric core surrounded by a fluoropolymer clad which in turn is surrounded by a tight-fitting sheathing of transparent or translucent material such as acrylic, polycarbonate, polyvinyl chloride or silicone polymer which has been extruded over the fluoropolymer clad core.

It is a further object of the present invention to provide a transparent or translucent jacket in a manner not to alter the optical transmission properties of thermoset, thermoplastic or liquid optical conduit.

It is a further object of the present invention to provide a transparent or translucent jacket with differing physical properties.

It is a further object of the present invention to provide a transparent or translucent jacket capable of accepting light enhancing fillers, colorants, particles, ultraviolet stabilizers, and/or related materials.

It is a further object of the present invention to provide a transparent or translucent jacket with symmetrical and/or asymmetrical cross sectional shapes.

SUMMARY OF THE INVENTION

Some of the objects of the present invention are accomplished by the manufacture of a clad, optical conduit in which the conduit or core is surrounded by a shrunk, heat shrinkable tube, such as a fluoropolymer including Teflon® to provide a snug, uniform cladding around the core, and a relatively thin, minimized, uniform gap between the cladding and the core. The improved clad, optical conduit may be made in conventional reactors whereby a conventional monomer mixture is placed inside of expanded, heat shrinkable tubing, which in turn has been placed and secured snugly within another tube, or manufacturing jacket made of a durable, relatively thick material; progressively polymerized from one end to the other to form a flexible core in a manner so as not to shrink the heat shrinkable tube to its fully shrunk condition prior to when the monomer mixture has achieved the degree of polymerization desired for the core while it remains in the reactor; removing the assembly containing manufacturing jacket and heat shrinkable tubing containing the polymer core from the reactor; removing the manufacturing jacket; and applying heat to the heat shrinkable tubing containing the polymeric core to cause it to shrink and form a snug fit clad around the polymeric core. Alternatively, the core may be made of other optically conductive material such as, for example, optical quality glass and various liquids. The heat shrink cladding surrounding the core provides a clad, optical conduit having improved optical transmission and emission properties both in straight or bent configurations.

The present invention is also directed to a optical conduit having a liquid, thermoplastic or thermoset, light transmitting core surrounded by a fluoropolymer cladding which is in turn surrounded by a tight-fitting, finish polymer jacket which may be either transparent or translucent, and is preferably made of a polyvinyl chloride, polycarbonate, silicone or acrylic material. Numerous fillers may be used in the finish jacket polymer and the finish jacket polymer may be formed into various shapes, thus, for example, allowing a round optical fiber to be tightly jacketed with a square or other shaped finish polymer jacket.

The preferred method of forming the finish jacket around the fluoropolymer cladding is by extruding the finish jacket around the clad, cured core using a cross head extrusion die.

DETAILED DESCRIPTION OF PREFERRED AND ALTERNATE EMBODIMENTS

Some of the objects of the present invention are accomplished by a process in which clad, optical conduit is manufactured with the improved conduit having a light transmitting core having a relatively high refractive index surrounded by a tubular cladding made of a heat shrinkable material having a relatively low refractive index compared to that of the core and having a minimized, relatively narrow, uniform gap between the inner periphery of the cladding and the outer periphery of the core. The core may be made of polymeric material as disclosed in U.S. Pat. No. 5,122,580 or may be made of glass, or other known materials used for the manufacture of optical conduit. The present invention is directed to such clad, optical conduit, the manufacture of single, clad, optical conduit and the simultaneous manufacture of a plurality of such clad, optical conduit.

Heat Shrink Clad Features of the Present Invention

By reference to FIGS. 1–9 preferred embodiments of the improved heat shrink clad, optical conduit and their method of manufacture will be described.

Referring first to FIGS. 1–2, known clad optical conduit and their method of manufacture will be described in order to provide a meaningful context within which problems known in the field of the invention will be discussed and within which the present invention will be described. As is known and described in U.S. Pat. No. 5,122,580, incorporated by reference as if fully set forth herein, clad, optical conduit may be manufactured by a process in which cylindrical Teflon® fluoropolymer tubes are filled with a conventional monomer mixture, placed in a U-configuration in a reactor and then polymerized within and along the length of the tube within the reactor to form a flexible, light transmitting and emitting core having a relatively high refractive index surrounded by a comparatively low refractive index fluoropolymer cladding. During and after polymerization the inner core typically exhibits shrinkage and, in conjunction with the cladding's lack of adhesive properties, causes a gap to be created between its outer periphery and the inner periphery of the cladding.

Also, not shown in U.S. Pat. No. 5,122,580, but used commercially and as shown in FIG. 1, a before polymerization, cross-sectional view of a conventional, clad and manufacturing jacketed tube assembly is shown having a flexible manufacturing jacket 1 surrounding a conventional, non heat shrink, fluoropolymer tube 2. Although the tube assembly may be of virtually any length, but is generally bent into a U-shape for manufacturing and is up to about 60 feet in total length, for purposes of illustrating problems currently of interest in the field of the invention, a small section of a nominal straight tube length of about 30 feet having a top end 4 and a bottom end 5 is shown. The liquid monomer mixture 3 filled fluoropolymer tube 2 of the type described in U.S. Pat. No. 5,122,580 is then polymerized in a conventional manner, such as by progressive polymerization, from its lower end 5 to its upper end 4, in a relatively warm bath sufficient to permit relatively slow polymerization as also described in U.S. Pat. No. 5,122,580.

After polymerization, as shown in FIG. 2, the polymerized, clad, optical conduit, with the flexible, manufacturing jacket 1 removed is illustrated as having a surrounding fluoropolymer cladding 6 with its core 7 being of a polymerized, flexible light transmitting polymer having a relatively high refractive index. During the polymerization process the core material typically shrinks about 12–15 percent in volume. Because polymerization usually slowly takes place in the U-shaped tubes, the radial shrinkage is somewhat minimized and the weight of upper, liquid polymerizing mixture flows downward, tending to fill the fluoropolymer tube 2. Also, because pure fluoropolymer clad such as Teflon® lacks any known adhesive properties, it pulls away from the wall of the polymerized core and tends to create a gap 8 between the inner periphery of the fluoropolymer tube 6 and the core 7. As discussed in the '332 patent, an air gap or a gap filled with equivalent material is essential to achievement of good optical properties of the finished clad, optical conduit. Also, because of the shrinkage, the total length of the core 7 will decrease in comparison to the length of the prepolymerized monomer filling 3 in the fluoropolymer tube 2. Thus, the top end 9 and bottom end 10 of the polymerized core 7 are shown at different positions with respect to the clad top end 4 and bottom end 5 than prior to polymerization to illustrate this shrinkage phenomenon; although it should be appreciated that the actual shrinkage occurs at either top end of the U-shaped tubes, both of which are at the "top" as described in U.S. Pat. No. 5,122,580.

As shown in FIG. 3, a cross-sectional view taken along line 3—3 of FIG. 2, the outer cladding 6, the polymerized core 7 and the gap 8 are shown. Typically gap 8 contains only air, which has a nominal refractive index of 1.0. Typically, gap 8 is not uniform in width between the outer periphery of core 7 and cladding tube 6, as illustrated in both FIGS. 2 and 3. The gap 8 may contain some other optically conductive material besides air, such as for example nitrogen so long as the filler material has a relatively low refractive index compared to the refractive index of the core 7, whether the core be of a polymerized material or of some other material such as glass.

Clad, optical conduit made by conventional processes as described in U.S. Pat. No. 3,641,332 and U.S. Pat. No. 5,122,580 or conventional, commercially used processes using the manufacturing jacket have limitations regarding optical efficiency as well as scattering problems, such as for example that they exhibit numerous bright and dark spots, especially at bends in the conduit Such optical conduit typically also have loose air pockets which can readily be felt and seen along their length. It is presently believed that at least part of the optical problems are associated with the relatively large air non-uniform gaps 8, as illustrated in FIGS. 2–3 and 8–9 of conventional, clad, optical conduit.

Conventional, clad, optical conduit typically has a relatively thin, i.e., 0.005 to 0.050 inch thickness fluoropolymer, such as Teflon® cladding with an inside diameter from about ⅛ to ¾ inch. The cladding is a conventional fluoropolymer such as fluorinated ethylenepropylene copolymer, including for example FEP Teflon® made by DuPont, which may be manually surrounded with or, in some circumstances, simultaneously co-extruded with a thermoplastic manufacturing jacket such as polyethylene or polyvinyl chloride to improve handling of the thin tubing. The manufacturing jacketed fluoropolymer tube is filled with a thermosetting organic monomer mixture such as set forth in U.S. Pat. No. 5,122,580, which in turn is polymerized progressively along the length of the tubing assembly by a conventional process as described in U.S. Pat. No. 5,122,580. Due to the relatively low boiling point of the typical organic monomers used for the polymeric core, the polymerization reaction is preferably performed at relatively low temperatures such as 36° to 70° C. and under pressure of up to about 250 psi to help avoid formation of bubbles and voids in the core during polymerization.

The outer polyethylene or polyvinyl chloride manufacturing jacket surrounding the thin fluoropolymer tubing functions to facilitate ease of handling and also functions to protect the thin cladding in two ways. First, because typically a plurality of the tube assemblies are loaded inside the manufacturing reactor for simultaneous polymerization, the outer polyethylene or polyvinyl chloride jackets protect the relatively thin fluoropolymer tubing from collapsing due to the forces exerted by the weight of upper tubing assemblies positioned above relatively lower tubing assemblies. This function is similar to the function performed by the perforated tube support plates 20–30 as described in U.S. Pat. No. 5,122,580. Second, because the thermosetting monomer mixture contracts during polymerization, a relatively high vacuum would be created inside of the fluoropolymer tubing in the absence of the manufacturing jacket. Such a vacuum would tend to collapse the Teflon® cladding. However, the presence of the jacket walls creates a pseudo-adhesive force which is not well understood, but which prevents the cladding from collapsing. During co-extrusion of the outer jacket and the inner thin fluoropolymer tubing the inside wall of the outer jacket and the outside wall of the fluoropolymer tubing come tightly together. When the hot polymer melt cools and subsequently contracts, a pseudo-adhesion force is also created between the outer periphery of the cladding and the inner periphery of the jacket to thus effectively counteract the force due to the vacuum created inside of the cladding.

Also, because of uneven contraction of the thermosetting monomer mixture during polymerization, both radially and laterally in relation to the cladding, and because the fluoropolymer tubing itself does not have a uniform inner diameter along its length, with radial variations of 0.003 to 0.005 inches in a typical ⅛" I.D. section of tubing, the range of gap widths varies along the length of the tubing. In other words, in reference to FIGS. 2–3, the distance between the core 7 and the cladding 6, i.e., the gap 8, will vary along any given length of the coated, optical tube and may also vary radially to produce readily observable air pockets.

The significance of non-uniformities in the gap 8 is that when light is introduced into one end of a straight light conduit, i.e., the core tube, the varying gap widths cause the appearance of bright and dark spots on the outer periphery of the light emitting conduit. Further, when the light emitting conduit is bent or curved to form shapes, at the locations where the cladding comes in relatively closer proximity to the core, i.e., at bends, the light appears to be brighter than at straight regions along the conduit. Thus, in both straight and curved clad, optical conduits, the existence of non-uniform gaps defeats and detracts from the objective of emitting uniform light from the clad conduit. In many cases these relatively bright and relatively dark spots are readily observable to the naked eye.

In general, for coated optical tubes within the field of this invention, light is emitted at the end opposite the light source and through the circumferential periphery along its length. It is believed that the size of air gaps, i.e., the distance between the outer periphery of the core and the inner periphery of the cladding and the length of the gap determine the intensity of emitted light along the gap. Thus, the present invention provides for a more intense emission of light along a gap for a given length, gap thickness and light source because its relatively smaller gap provides for a shorter distance of travel for the light emitted from the core to the surrounding cladding. Also, in comparison to the conventional clad optical conduit, a greater percentage of the total light is emitted from the circumferential periphery than from its nonsource end. The non-uniformity of light from the circumferential periphery is believed to be determined by the non-uniformity of the air gap. Thus, the present invention, because of its narrow, minimized uniform air gap in relation to conventional clad optical conduits, has not only greater intensity of emitted light from the circumferential periphery, but also improved uniformity of emitted light.

Figure 9:
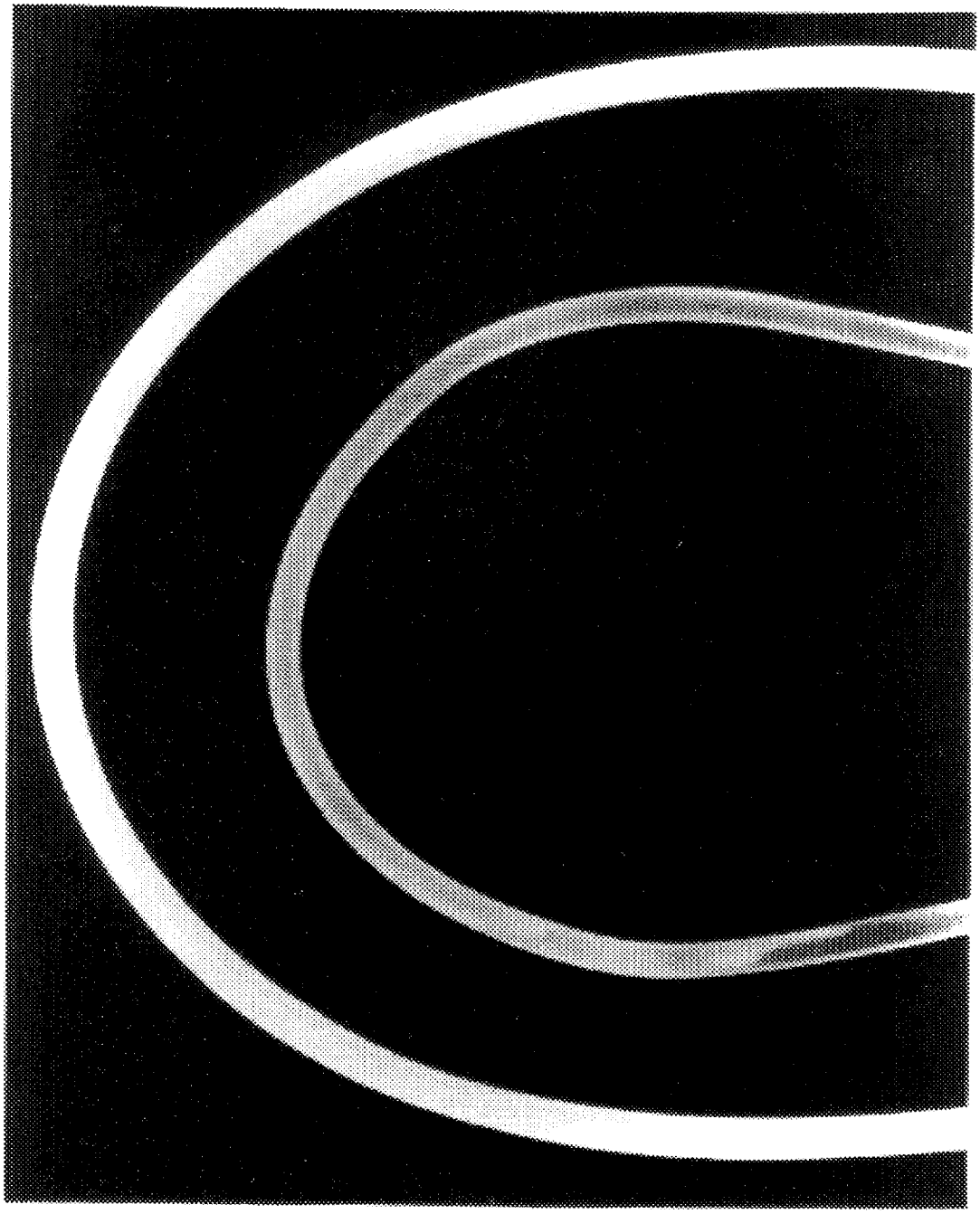
FIG. 9 is a photograph showing a light transmitting and emitting bent section of a clad, optical conduit as disclosed in Ser. No. 883,350, and a light transmitting and emitting a bent section of a heat shrink clad, optical conduit of the present invention.

For example, the FIGS. 8–9 photographs illustrate this phenomenon. The lower portion of FIG. 8 shows, a cross-section of a clad, optical conduit made in accordance with U.S. Pat. No. 5,122,580. To the left side of the conduit is a very distinct, crescent shaped gap which may be seen between the outer periphery of the core and the inner periphery of the Teflon® clad. The upper portion of FIG. 8 shows, a cross-section of a clad, optical conduit of the present invention. As may be readily observed there is no visible, uneven gap between the core and the clad. Indeed, the clad is so tightly formed around the core that no gap is visible, it being too narrow to be seen with the naked eye.

Referring to FIG. 9, a light emitting, conventional clad, optical conduit of Ser. No. 883,350, and a light emitting, clad conduit of the present invention are shown with an identical light source at one end of each conduit. The conduit of the present invention is the upper conduit, having the larger radius of curvature of the two. As is readily observable, the upper conduit is much brighter, thus illustrating the higher light emission property, or greater intensity of the present invention conduit. Also, the presence of non-uniformities in light output illustrated in the lower conduit, especially at its left side. These non-uniformities of emitted light correspond to air gaps which are readily observable with the naked eye as illustrated in FIG. 8. It is also readily observable from the FIG. 9 comparative photograph that the conduit of the present invention emits light relatively uniformly along its entire, bent length, whereas the conventional conduit has a higher intensity at the bend than along its straight portions.

Further in reference to FIGS. 4–7, the use of a heat shrinkable FEP Teflon® or other, equivalent heat shrinkable fluoropolymer material in a clad, optical conduit to aid in making a relatively narrow, minimized, uniform gap between the core and the cladding will be described. It has been discovered that use of a heat shrinkable fluoropolymer such as Teflon® or other heat shrinkable material which has a low refractive index will result in production of clad, optical conduit having a minimized uniform gap between the core and the cladding. It has also been discovered that not only will the gap be relatively uniform, but it will also be of relatively small, and therefore, of advantageous thickness along the entire length of the light emitting conduit. The optical efficiency and optical uniformity of straight as well as bent tubes are unexpectedly improved in conduit of the present invention compared to conventional conduit made with a non-shrinkable fluoropolymer cladding.

Methods of production and properties of heat shrinkable tubing are well known. Heat shrinkable tubing is normally provided in its expanded, or pre-shrunk state. With the brief application of heat such tubing shrinks and molds itself slowly around the form it was placed, even the most intricate and irregular shapes, to form, a snug, tight covering. Sources of heat and methods of heating expanded, heat shrinkable material are known and include, for example, by convection, radiation, or excess heat of reaction. Heat shrink tubings are available in various shrink ratios, such as for example, 1.3 to 1; 2 to 1; 3 to 1; 4 to 1; etc. Usually the shrinkage of the heat shrinkable tubing occurs only radially and the length of the tubing usually remains constant. Conventional heat shrinkable tubings are produced from numerous materials such as polyvinyl chloride, polyethylene and other poly (olefins) or fluoropolymers. These heat shrinkable tubings are also available in sizes ranging from approximately 1/32" to 6" in diameter.

Selection of the heat shrink tubing must be such that the potential cross-sectional inner diameter of the heat shrink tubing in its shrunken state is less than the outer cross-sectional diameter of the polymerized or finished core material.

In the selection of the heat shrink clad, its shrink ratios and diameter sizes will be affected by differential diameters of the heat shrink within the concept of the present invention. Differential diameters pertain to varying diameters of the heat shrink clad at various times during the process of manufacture of the linear light conduits of the present invention.

A first inside diameter of the clad will be that which existed before the heat shrink clad was made into its expanded form and must be smaller than the ultimate outer diameter of the intended polymerized core. The first inside diameter of the clad should be smaller than the intended core by a factor of about 10% or greater. A second inside diameter is the diameter of the clad in an expanded, pre-shrunk state. A third inside diameter of the clad will be that to which it has been shrunk extremely tightly around the core and which will be only slightly, preferably in a microscopic order of magnitude larger than the outer diameter of the polymerized core, and which will generally conform to the contours of the polymerized core. Selection of a heat shrink clad, therefore, must take into consideration the three differential inside diameters of the heat shrink cladding.

The present invention is directed to use of heat shrink tubings as previously described, preferably in conjunction with the manufacture of flexible, clad, optical conduit as described in U.S. Pat. No. 5,122,580 or as otherwise commercially available. Production of clad, optical conduit of the present invention is presently limited to the size of the heat shrink tubing commercially available, presently believed to be 1/32" to 6" in diameter. It is within the scope of the present invention to produce smaller or larger diameter clad, optical conduits should smaller or larger diameter heat shrinkable tubing become commercially available.

Also, although improved clad, optical conduits of the present invention can be prepared with conventional heat shrinkable materials, it is presently believed that certain impurities are found in heat shrinkable tubing prepared by conventional methods and that these impurities result in less than optimum optical properties for the finished clad, optical conduits of the present invention. It is therefore believed and preferred that heat shrinkable tubing be manufactured by employing in its manufacturing process an inert gas, such as helium, which will produce a heat shrinkable tubing having relatively fewer impurities and therefore will result in a finished, clad, optical conduit of the present invention having even further enhanced optical properties.

As shown in FIG. 4, a manufacturing jacket 9 surrounds a pre-shrunk, heat shrinkable cladding 10 which in turn surrounds a liquid monomer mixture 11.

Referring to FIG. 5, the pre-shrunk, heat shrinkable cladding 10 is shown containing the polymerized core 11, which has exhibited shrinkages as described with reference to FIG. 2. The manufacturing jacket 9 of FIG. 4 has been removed. It may be observed that a narrow gap 12 remains between the core 11 and cladding 10.

As shown in FIG. 6, after heat has been applied to the cladding 10, such as by hot air blower for example, the heat shrinkable Teflon® fluoropolymer cladding 10 has been shrunk to form an even more narrow, relatively uniform gap 14 between the core 11 and the shrunk cladding 13.

FIG. 7, a cross-sectional view taken along line 7—7 of FIG. 6 illustrates this narrow, minimized, uniform gap 11. Gap 11 may be of air, or some other material having a refractive index relatively small in comparison to the refractive index of the core material 11.

As illustrated, for example, in FIG. 6, because of the inherent properties of the polymers used in the present invention there is no fusion between the polymerized inner core 11 and the cladding 13. Absent fusion of two materials, as exists in the present invention, there must exist a gap, however small, between the two materials. Herein, all references made to the existence of such gap, are directed to minimizing the mandatory gap to a microscopic level. In reference to the invention described in U.S. Pat. No. 3,641,332, the relatively large size of the gap therein described was an integral part of the invention. In the present invention, the minimization and substantial illumination of such gap is an integral part thereof.

EXAMPLES OF HEAT SHRINK CLADDING

Example 1

A section of FEP Teflon® fluoropolymer heat shrinkable tubing with a nominal diameter of 3/8" and having a 1.6 to 1 shrink ratio, Zeus Industrial, Part No. 3H 6HS 0, in the expanded state was filled with a typical, conventional formulation of a thermosetting monomer mixture and was polymerized under pressure. After polymerization, the outer surface of the sample appeared to be non-uniform upon visual inspection. However when the sample was exposed briefly to heat, the heat shrinkable tubing exhibited uniform, radial shrinkage and the resulting clad conduit had a very uniform appearance based upon visual inspection. This sample was a laboratory scale sample in which a single tube was prepared. It appears from this sample that clad conduit having cross-section as shown in FIG. 7 can be made with substitution of a heat shrinkable cladding in place of a nonshrinkable type cladding.

Typically, however, for commercial quantities, clad, optical conduits are batch processed in reactors in which a plurality of tube assemblies containing monomer mixture are simultaneously polymerized and the above-described method may not yield good results in such batch processing.

Example 2

A conventional reactor was loaded with a plurality of heat shrinkable tubing assemblies and filled with a conventional monomer mixture and then processed in the conventional fashion. It was discovered that the thin, heat shrinkable Teflon® tubings could not support themselves and their walls collapsed at various locations, as was readily observable upon visual inspection and which thus resulted in non-uniform gaps between the core and the cladding.

To alleviate this collapsing problem, a relatively thick, chemically stable flexible manufacturing jacket could be manually placed outside of the heat shrink cladding as referred to previously with respect to conventional processing.

Example 3

A four-feet long sample of the same heat shrinkable tubing mentioned in Example 1 was placed inside of a four-feet long section of polyethylene tubing. The polyethylene tubing or manufacturing jacket was also cut along its entire length in order to facilitate insertion of the heat shrinkable tubing. The diameter of the tubing was chosen so that the heat shrinkable tubing, in its expanded form, fit very snugly inside of the polyethylene tubing but not as tightly as if the polyethylene tubing were extruded over the cladding. The thus nested tubings were wrapped with tape so that the heat shrinkable tubing was completely covered. The taped, nested tubings were then filled with a conventional thermosetting monomer mixture by placing the monomer inside of the heat shrinkable tubing. The monomer was then polymerized under pressure. After completion of polymerization, the polyethylene jacket was peeled off and the heat shrinkable tubing which contained the flexible, polymerized tube was of non-uniform, generally cylindrical configuration along its entire length upon visual inspection. When the polymerized section of Teflon® fluoropolymer cladding was exposed to heat, the heat shrinkable Teflon® fluoropolymer cladding shrank radially and, yielded a clad, monofilament conduit which had a narrow, uniform, minimized cylindrical appearance along its entire length upon visual inspection. The clad, monofilament conduit also exhibited fairly uniform light emission along its entire length and circumferential periphery, both in straight sections and bent sections.

Example 4

A clad, monofilament conduit was made by the same procedure as in Example 3, except that a polyvinyl chloride manufacturing jacket, which was also slit longitudinally, was used to wrap the heat shrinkable tubing and except that the slit was closed by gluing after insertion of the heat shrinkable tube. Other means to close the jacket may be used such as by tape, laser induced bonding or by other conventional methods. After polymerization and after heat shrinking of the heat shrinkable Teflon® fluoropolymer cladding, the clad conduit was of uniform, cylindrical contour along its entire length and emitted light of a very uniform flux along its entire length and periphery, both in straight sections and bent sections.

Example 5

A plurality of conduit of the type described in Example 4 were prepared and loaded into a conventional polymerization reactor and polymerized, as described in Ser. No. 883,350. When the polyvinyl chloride manufacturing jackets were peeled off the samples, each of the clad monofilament conduits in an unshrunken condition, had non-uniform, generally cylindrical contours along their entire length. Each of these conduits was then subjected to heat treatment and after treatment the finished, clad, conduits had uniform cylindrical contours along each of their entire length by visual inspection. Also each conduit was light tested and the light emitted from each conduit was very uniform along the entire length and along the circumference of each conduit upon visual inspection, both in straight and bent configurations.

Extrusion Of Manufacturing Jacket Over Heat Shrink Cladding

Normally the preferred method of manufacturing the optical conduit is to co-extrude a manufacturing jacket over the fluoropolymer cladding prior to polymerization. However, that method of manufacture is not, as a practical matter, effective with heat shrinkable fluoropolymer tubing because the temperatures required in the hot melt extrusion process using preferred manufacturing jacket materials, although considered low extrusion temperature polymers in the industry, are such that the heat released during the hot melt extrusion of the manufacturing jacket causes the heat shrinkable fluoropolymer tubing to shrink from its expanded state to its shrunken state and thus result in defeating the main purpose for which the heat shrinkable tubing is used, that is, the creation of a narrow, minimized uniform gap between the tube and the core in the tubing after the polymerization reaction has occurred. It is important to the present invention that the heat shrinking occur during and/or after polymerization, rather than before polymerization of the core material so that a narrow, minimized uniform gap between the core and the cladding results relative to the gap in the conduit of the '332 patent or application U.S. Pat. No. 5,122,580.

Two methods of extruding the manufacturing jacket over the fluoropolymer heat shrink clad were found not to shrink the second diameter, expanded form, clad to an extent that the required final shrink function of the heat shrink clad was impaired, have been discovered. The first method utilizes a low extrusion temperature manufacturing jacket material which is extrudable at a temperature less than that required to shrink the heat shrink clad. The second and preferred method, is to pressurize the interior of the heat shrink clad to a pressure greater than the ambient, exterior pressure and to maintain the greater internal pressure while extruding over the clad a low extrusion temperature manufacturing jacket material which is extrudable at a temperature greater than that required to shrink the heat shrink clad. The second method is preferred because the manufacturing jacket material was found to perform the functions required of a manufacturing jacket better than those materials which are extrudable at the even lower temperatures.

The two methods of extruding the manufacturing jacket over the fluoropolymer cladding were tested. Use of a low extrusion temperature ethylene-vinyl acetate co-polymer as the manufacturing jacket is described in Examples 6 and 7.

Use of conventional poly(ethylene) as a manufacturing jacket is described in Example 8.

A series of copolymers of ethylene-vinyl acetate manufactured by USI Chemicals Co. under the trade name ULTRATHENE® are usable for extrusion as a manufacturing jacket over the heat shrink fluoropolymer clad. These copolymers are described in USI brochure #P4-3874/4402.

As referred to above, some co-polymers of poly(ethylene) can be extruded over fluoropolymer heat shrink tubing at relatively low temperatures—approximately 210 degrees Fahrenheit—without affecting shrinkage. Further, it has been discovered that by plugging one end of a length of fluoropolymer heat shrink tubing and pressurizing and maintaining the pressure at a relatively high pressure of approximately 40 to 100 psi, it is possible to extrude conventional low density poly(ethylene) over fluoropolymer-heat shrink tubing without affecting shrinkage. The pressure inside of the tubing will vary, depending upon such factors as the type and wall thickness of the tubing material used.

In the production of one type of conventional clad conduit, low density poly(ethylene) is extruded over fluoropolymer tubing as a manufacturing jacket. This poly (ethylene) jacket is, however, removed subsequent to the progressive polymerization of the core. Extrusion, without the pressurization technique mentioned above, of conventional low to high density homopolymers of poly(ethylene) or other conventional polymers over the fluoropolymer-heat shrink tubing will affect shrinkage and consequently defeat the purpose of utilizing heat shrink tubing as a clad for the production of light conduit according to the teaching of the present invention.

Example 6

UE 631-04 ULTRATHENE® copolymer was successfully utilized to extrude over fluoropolymer heat shrink cladding as a manufacturing jacket without affecting shrinkage with normal jacket wall thicknesses, i.e., 0.030 to 0.090 inches. A slight shrinkage was observed when the wall thickness of the UE 631-04 ULTRATHENE® copolymer was substantially increased to 0.100 inches and/or in larger size tubings, such as 0.500 inch diameter and above. Due to the softness of the ULTRATHENE® copolymer material, as compared to the conventional material being presently used as a manufacturing jacket, a thicker wall jacketing is applied. Also, the inherent, relatively gummy nature of the ULTRATHENE® material causes difficulty in handling during manufacturing.

Example 7

A continuous length of approximately 30 feet of the fluoropolymer-heat shrink cladding was plugged at one end and pressurized moderately to approximately 45–50 psi at the opposite end and maintained at this pressure while UE 631-04 ULTRATHENE® copolymer was applied as a manufacturing jacket. No shrinkage was observed even with relatively large wall thickness of 0.100 inches and large tubing size of 0.500 inch diameter.

Example 8

A longer continuous length of approximately 1500 feet of fluoropolymer heat shrink tubing was plugged at one end and pressurized at the opposite end and maintained at a pressure of about 45–50 psi while a conventional homopolymer of poly(ethylene) was extruded on the fluoropolymer heat shrink tubing. No significant shrinkage was observed. When the manufacturing jacket was removed, light conduits prepared using the tubing from this batch exhibited the properties described herein in regard to the heat shrink clad optical conduit.

Example 9

A linear glass rod approximately 3 feet long with an outside diameter of 0.375 inches was cleaned with soap and water then washed with acetone twice and completely dried and flamed in an oven. The rod was then inserted inside an FEP heat shrinkable tubing, approximately 0.410 inches inside diameter with a wall thickness of 0.012 inches. The heat shrinkable tubing was then shrunk around the rod with the application of heat. One end of the rod was placed in an illuminator and then illuminated. Change of color in the rod could be observed by changing the color of light at the source of light in the illuminator. The glass rod was not of optical quality, therefore the attenuation of the light was readily observable. It is believed, however, that use of an optical quality glass rod would significantly reduce attenuation of the light without effect on application of a heat shrinkable cladding to the glass rod to form a uniform, minimized narrow gap therebetween.

As shown by these examples the heat shrink fluoropolymer or other heat shrunken material provides a means to form a narrow, minimized uniform gap surrounding the core of a flexible, clad, monofilament conduit and/or surrounding other optical conduit such as a glass rod.

Finish Jacket Features of the Present Invention

The present invention is also directed preferably to a finish jacket of transparent or translucent polymer extruded over a thermoset monofilament optical conduit having a linear light transmitting, polymeric, flexible, solid core surrounded by a fluorinated ethylene-propylene copolymer such as Teflon® FEP, and most preferably to the heat shrink clad type of thermoset optical fiber described above.

Also, it is believed that conventional liquid core optical conduit may be surrounded with a finish jacket of the present invention.

The transparent or translucent finish jacket is preferably of acrylic, polycarbonate or polyvinyl chloride polymer, although others may be used depending upon the end use and the properties of the polymer.

A relatively thin, uniform gap exists between the outer surface of the core and the inner surface of the clad and between the outer surface of clad and the inner surface of the finish jacket.

The wall thickness of the finish jacket is preferably about 0.010 inches to about 0.50 inches, with the most preferred wall thickness in the range of about 0.010 inches to about 0.3875 inches.

The general purposes and functions of the linear optical conduit form of the present invention are to provide area illumination and illumination of objects such as when used as tracks in floors or walls. The present invention may function for virtually all uses presently associated with neon lights and therefore may be considered to be a substitute for neon lighting in numerous instances. Also, the linear lighting forms of the present invention may be used for pool, spa and fountain lighting; perimeter and landscape lighting; display backlighting; aisle, track and step lighting; signage; exhibit and trade show booth accents, pool access lighting; medical instrumentation; architectural design; interior design; and in free standing art forms.

Figure 10:
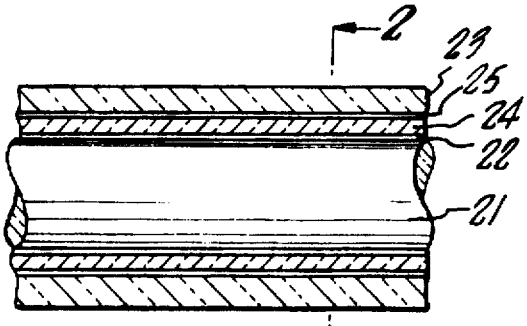
FIG. 10 is a partial, longitudinal, side cross-sectional view of a finish jacketed optical conduit of the present invention.
Figure 14:
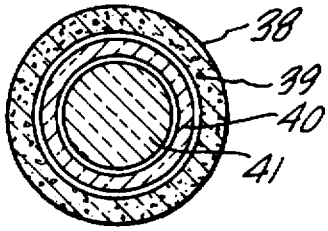
FIG. 14 is a cross-sectional view of a conduit of the present invention having a circular cross section and containing filler particles.
Figure 11:
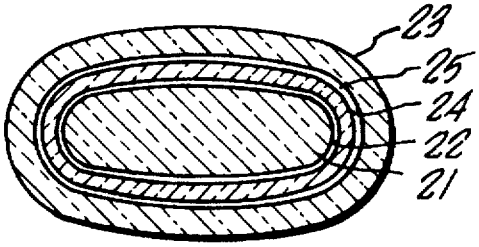
FIG. 11 is a transverse, cross-sectional view of the FIG. 10 conduit taken along line 2—2.

Referring to FIGS. 10 and 11 a longitudinal cross-sectional view and a transverse cross-sectional view of a preferred thermoset, monofilament optical conduit of the present invention is shown as having a flexible, oval cross-section, monofilament light transmitting polymeric core 21 surrounded by a fluoropolymer clad 24 such as Teflon® fluoropolymer. The conduit, of course may be of circular cross-section, as is illustrated in FIG. 14. Surrounding the clad is a finish jacket 23 preferably made of a material such as polyvinyl chloride, acrylic or polycarbonate polymer. Other materials such as silicones may be used so long as they perform the functions as hereinafter described. Also shown in FIG. 10 is a relatively narrow, minimized relatively uniform air gap 22 between the outside of the core 21 and the inside of the clad 24. Again referring to FIG. 10, relatively narrow, minimized relatively uniform gap 25 is shown between the outside of the clad 24 and the inside of the polymer finish jacket 23. Although the gaps 22 and 25 in FIG. 1 are shown to be of approximately the same thickness, identical gap thickness is not required. The present invention may be used with conventional thermoset optical conduit having a relatively large, non-uniform gap as described in the Reick et al. '322 patent, and the improved core conduit of U.S. Pat. No. 5,122,580, or the relatively narrow, uniform gap associated with a shrunk, fluoropolymer clad as described above.

Distinctions Between Manufacturing and Finish Jackets

Although the materials used in the finish jacket of the present invention may be the same materials used for the manufacturing jacket used in production of some conventional thermoset optical conduit, as described above, the manufacturing jackets generally have no utility as a finish jacket of the present invention except in the limited case of co-extrusion of low extrusion temperature manufacturing jacket over a non-heat shrink clad which is used to prepare a conduit having a thermoset or thermoplastic core, which generally produces an inferior and unacceptable product.

The finish jacket of the present invention is different in many respects compared to the conventional manufacturing jacket. In the production of certain conventional thermoset optical conduit, a manufacturing jacket is co-extruded over the fluoropolymer tube. The monomer mixture that creates the light transmitting core is put into the co-extruded tube and subsequently polymerized. The manufacturing jacket functions primarily to protect the fluoropolymer cladding and core from abrasion, crimping, and deformation during the manufacturing process.

One problem common to all known conduit made with a manufacturing jacket is that the lengths of unspliced conduit are limited to about 68 feet because this is the presently known maximum length which can be polymerized in conventional reactors. Also, as a practical matter, due to imperfections often found at the U-shaped bend, shorter lengths of about 20–25 feet often are the maximum practicable lengths available, when acrylic, polycarbonate or rigid silicone manufacturing jackets are used. When softer materials such as polyvinyl chloride are co-extruded as conventional manufacturing jackets, the relatively high heat and pressure required causes collapse or partial collapse of the jacket a random locations along the length. This collapse or partial collapse results in a deformed finished product, especially when irregular cross sectional shapes are desired.

Also, when thermoset optical conduit is fabricated using conventional, relatively high extrusion temperature jacketing materials and heat shrink fluoropolymer clad, as described above, jacketing the clad before polymerizing with the finish jacket material has been found to cause the heat shrink material to contract prematurely and to prevent formation of an acceptable heat shrink clad finished conduit.

The purpose of manufacturing jackets is to provide structural integrity during the polymerization process and, in manufacture of linear illumination optical conduits, the manufacturing jackets are removed and discarded when polymerization is completed The manufacturing jacketing should be about 0.0300 inches to 0.200 thick and made of a material sufficient to maintain a relatively consistent core shape.

In contrast, the finish jacket is preferably placed around the clad core to achieve desired optical properties and to protect the finished product during end use. In order to achieve these desired optical properties, it is essential that a relatively uniform, relatively tight fit of the finish jacket over the clad core be accomplished. In general, the more tightly the finished jacket fits around the base conduit, the better the optical characteristics of the finished product. In accordance with the present invention, one important function of the extrusion process is the creation of a relative uniformity of the distance between the inner surface of the finish jacket and the outer surface of the fluoropolymer clad of the base conduit. Another important function of the extrusion process is the minimization of the gap, if any, which may be created between the interior surface of the finish jacket and the exterior surface of the fluoropolymer clad of the base conduit. In accordance with the present invention, it is believed that there is a maximum allowable distance between the inner surface of the finish jacket and the outer surface of the fluoropolymer clad of the base conduit. It is further believed that the maximum allowable distance will vary depending upon the outer diameter of the base conduit, that is, the smaller the diameter of the base conduit, the smaller, the maximum allowable distance between the inner surface of the finish jacket and the exterior of the base conduit. For example, a base conduit having an exterior diameter of about 0.50 inches should not have a finish jacket having an interior diameter greater than about 0.55 inches, and a base conduit having an exterior diameter of 0.125 inches should not have a finish jacket having an interior dimension greater than about 0.150 inches.

Therefore, generally the conventional manufacturing jackets will not be suitable for use as a finish jacket(s) of the present invention.

Process Of Making Finish Jacketed Thermoset Optical Conduit Of the Present Invention The preferred method of making the finish jacketed thermoset, monofilament optical conduit of the present invention is by extrusion of a bondable polymer over an expanded heat shrink fluoropolymer clad thermoset optical conduit, thereby simultaneously shrinking the clad.

Starting Materials

The conventional fluoropolymer clad, thermoset, monofilament optical conduit used as the base, or starting material may be any one of the types of conduit shown and described above or in the Reick et al. '322 patent; in U.S. U.S. Pat. No. 5,122,580; and/or as commercially available from Lumenyte International Corporation or from other commercial sources. The preferred base starting material is the thermoset optical conduit having a heat shrink type clad and having the manufacturing jacket removed, as described above.

Splicing the Base (Optional)

Conventional heat shrink clad or non heat shrink clad thermoset optical conduit is normally available in lengths up to approximately 68 feet maximum. When longer lengths are desired, sections of conventional clad thermoset optical conduit may be spliced together by one of several methods to form a very long conduit which is to be fed to a conventional extruder in which the finish jacket polymer is extruded through a cross-head die.

Figure 12:
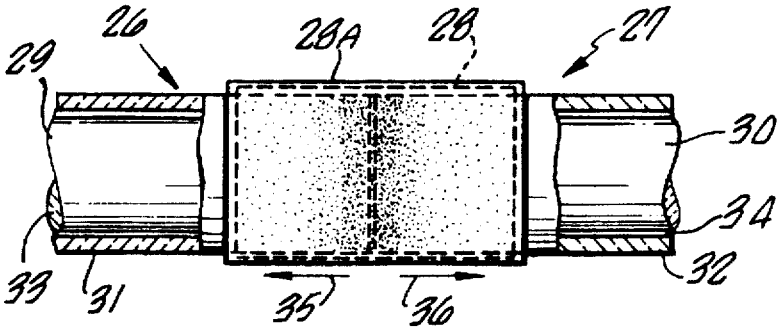
FIG. 12 is a partial, side cross-section view of a spliced base for use in the conduit of the present invention.

Referring to FIG. 12 the preferred method of splicing is described. Sections 26 and 27 of conventional clad thermoset conduit are shown joined by a surgical tape covered fluoropolymer sleeve 28. The sections 26, 27, respectively have cores 29, 30, cladding 31, 32 and gaps 33, 34, respectively. A sleeve made of fluoropolymer or other suitable material is wrapped or fashioned around the joint. The fluoropolymer sleeve is then wrapped or surrounded with surgical tape 28A or other suitable material which has been colored to have a relatively dark region in the center and to be progressively lighter near each end, as shown by the directions of the arrows 35, 36 in FIG. 12.

Figure 13:
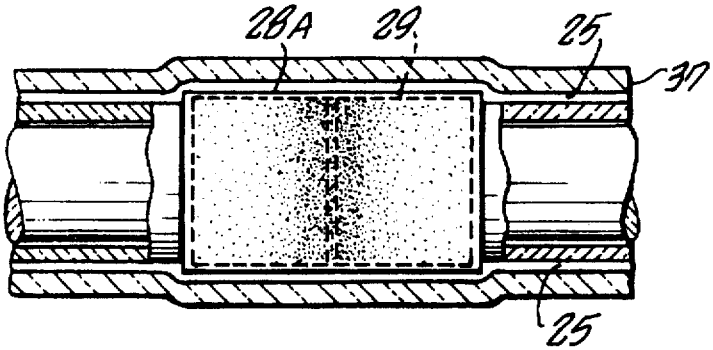
FIG. 13 is a partial, side cross-sectional view of a finish jacketed spliced base of the present invention.

It has been discovered that at the interface of core section 29 with core section 30, a relatively bright line of light normally results during illumination; however, when conduit sections are spliced so that the tape is darkened in the region where the two core sections adjoin and is progressively lightened as shown in FIG. 12, the bright line of light can be reduced, and in some instances eliminated for all practical purposes so that the illuminated optical conduit appears to provide uniform and continuous light rather than a hot spot at the splice. This effect is realized after the polymer finish jacket has been extruded over spliced sections and the conduit is illuminated. A section of a final product conduit of the present invention using the preferred base splicing technique is shown in FIG. 13 where the unnumbered, spliced base is shown within finish jacket 37.

By splicing together various lengths of conventional fluoropolymer clad thermoset optical conduit, spools of up to 5,000 feet or more in length of base optical conduit may be obtained.

One method of splicing conventional thermoset clad optical conduit to form a base conduit for feeding to an extruder is described as follows:

Step 1. Each end of the thermoset conduits to be spliced are cut squarely at 90° angles with a sharp razor blade so that they abut each other as smoothly and closely as possible.

Step 2. A fluoropolymer coupling sleeve is prepared by selecting a tube approximately 1 inch in length and having a diameter slightly larger than that of the clad optic core. A pencil or similar object with a tapered end is inserted into the end of the fluoropolymer sleeve so that the end of the tube is flared slightly. The fluoropolymer sleeve is flared in this manner at each end.

Step 3. The prepared fluoropolymer sleeve is slipped over the end of one of the fluoropolymer clad conduit sections to be spliced until the end of the conduit is about one-half way inside of the fluoropolymer sleeve.

Step 4. One to two drops of an acrylic solvent cement, such as Weld-On No. 16™ cement is applied to the end of the conduit that is inside the coupling sleeve.

Step 5. The end of the other conduit to be spliced is slipped into the sleeve and butted up against the previously inserted conduit until the solvent cement completely covers the ends of each conduit.

Step 6. The spliced sections are kept in a stationary position and allowed to dry for about 24 to 48 hours.

An alternate, and preferred method of splicing conventional thermoset clad optical conduit to form a base optical conduit for feeding to an extruder in accordance with the present invention is as follows:

Step 1. Follow steps 1, 2 and 3 of the previous method.

Step 2. One to two drops of an optically clear UV curing adhesive is applied to the end of the conduit section that is inside the coupling sleeve.

Step 3. The end of the other conduit section to be spliced is slipped into the sleeve and butted up against the end of the first conduit section until some of the adhesive completely covers both ends of the conduit sections.

Step 4. The assembly is placed under a UV curing lamp for sufficient time to cure, usually about five seconds.

Step 5. A piece of conventional surgical tape that has been air brushed with a relatively dark longitudinal line extending circumferentially around the sleeve and having gradations of darkness from the dark longitudinal center to very light coloring at either ends as illustrated in FIG. 3 is wrapped around the sleeve.

After extrusion of the finished jacket over the base thermoset conduit, this colored surgical tape functions to reduce the "hot spot" phenomenon otherwise associated with splices. As a practical matter, a finish jacketed thermoset optical conduit of the present invention masks this splice so well that it is extremely difficult to detect a hot spot with unaided vision when the conduit is illuminated.

In regard to the preferred method of splicing, the preferred UV curing adhesive is Norland Optical Adhesive 68 which is made by Norland Products, Inc. A conventional UV curing lamp which projects UV light between 320 and 400 nm is preferred. One of the major advantages of the UV curing technique is elimination of the 24 to 48 hour curing time required with the solvent cement technique.

It has been discovered that placement of the polymer finish jacket over the splice increases the strength of the splice because this outer jacket holds the splice in a fixed position and helps resists stretching of the core. The finish jacket also results in a smooth, continuous outer surface where the splice occurs regardless of the surface contour at the splice itself.

Selecting the Finish Jacket Polymer

Several types of commercially available polymers have been found to provide acceptable finish jackets, for the optical conduit of the present invention. These polymers are identified as follows:

Acrylic Polymers

Lucite 147KNC, poly (methyl methacrylate) available from E. I. DuPont, Wilmington, Del.

Plexiglass MC poly (methyl methacrylate) available from Rohm & Haas, Philadelphia, Pa.

Poly (carbonate)

Lexan 929, poly (carbonate) available from General Electric, Pittsfield, Mass.

Calibre 800, poly (carbonate) available from Dow Chemical, Midland, Mich.

Poly (vinyl Chloride)

Ethyl 7042, poly (vinyl chloride) available from Georgia Pacific Company.

Polyvin 6641, poly (vinyl chloride) available from Schulman, Akron, Ohio.

Other commercially available plastics believed to be capable of providing a finished jacket in accordance with the present invention include the following:

Silicone Based Polymers

Dow Corning 306 (silastic) available from Dow Corning Company.

GE SE 9058 available from General Electric, Waterford, Mass.

Ethylene-Vinyl Acetate Copolymers

Ultrathene® UE657 available from USI Chemicals Co., Cincinnati, Ohio.

Escorene LD-302 available from Exxon Corporation.

Poly (vinyl chloride)/Ethylene-Vinyl Acetate Copolymer Alloys

Poly (vinyl chloride)/ethylene-vinyl acetate copolymer alloys are available from various compounders.

Each of the finish jacket materials have distinctive properties which may render one material preferable to another for a specific end use as will be appreciated by those skilled in the art. For example, acrylic is comparatively more brittle than either polyvinyl chloride, polycarbonate or silicone. However, it transmits light very well. Acrylic is more rigid than some polyvinyl chlorides and silicones. Polycarbonate and silicone are known as high impact polymers and would be useful in applications where impact can be expected. Silicone polymers may be used in medical applications. In those applications where a bondable finish jacket is desired bondable polymers such as acrylic, polycarborate, polyvinyl chloride or silicone may be used.

Inclusion Of Fillers And Inserts

Fillers such as U.V. stabilizers, colorants, micro particles, microspheres, optical brighteners and enhancers, and the like may be included within the jacket material at this time by the chemical compounder or by the extruder. U.V. stabilizers may include such clad core and finish jacket protectors as blockers, inhibitors, retarders and the like. Inserts, such as defrosting heater wires, reflectors, "Gooseneck" type wires and the like, may also be included in the jacket during the extrusion process.

Extruding the Finish Jacket Polymer Over the Optical Conduit Base

The base conduit, either with a spliced length or an individual section, is jacketed with the desired finish jacket polymer by way of extrusion, preferably through a cross head extrusion die.

Polyvinyl chloride polymer is preferably extruded over the base conduit at temperatures of about 300° F. When polycarbonate is used as the finish jacket, extrusion temperatures are preferably in the range of about 500° to 560° F. When the finish jacket is made of acrylic polymer, the preferable extrusion temperature is about 300° F. to about 450° F.

It has been found that the preferred flow rates for extrusion are about 15 feet per minute when polyvinyl chloride polymer is used and about 10 feet per minute when either polycarbonate or acrylic polymer is used. In general, the flow rate for any given jacket material is the flow rate which yields a very tight, uniform fit of the jacket over the base conduit so that a finished product having a very small, uniform gap between the clad and the finish jacket results.

As described above, the finish jacket is formed, preferably, by extruding the desired polymer over heat shrink fluoropolymer clad core thermoset conduit through use of conventional extrusion equipment and techniques. It is believed that virtually any type of plastic extrusion machinery and techniques may be used provided that the equipment and techniques have been designed or modified to accommodate extrusion of the chosen materials. A number of samples of finish jacketed thermoset optical conduit of the present invention have been prepared using conventional thermoplastic, single screw extrusion equipment and using polyvinyl chloride, acrylic, ethylene-vinyl acetate and polycarbonate polymers for the jacket. It is believed that twin screw and thermoset extrusion equipment may also be used. When a heat shrink clad is used, the shrinking of the clad may take place either prior to the extrusion of the finish jacket or simultaneously with the extrusion of the finish jacket upon the base conduit wherein the cladding is automatically shrunk by virtue of the heat dissipated from the molten finish jacketing polymer.

Alternate Methods Of Manufacture

Although extrusion of finish jacket material over spliced sections of base clad core is the preferred method of manufacture of the present invention optical conduit, other methods of manufacturing such as variations of the extrusion process described above; casting; gluing two longitudinal sections; wrapping jacket around sections of clad core; hot bath or layering techniques; cold spray techniques and heat shrink techniques may be used. Although these various methods may be used to produce a finish jacket optical conduit, for various reasons none of these alternate methods are preferred.

Alternate Extrusion Methods

One alternate extrusion method involves using unspliced sections of conventional thermoset, clad optical conduit as the base conduit. In this process, lengths of base conduit are fed through extrusion machinery to produce a continuous length of finished product. This method is disadvantageous because it is very labor intensive, very cumbersome, and, most importantly, produces a finished product having inconsistent light transmission properties. Specifically, at the regions where the individual sections adjoin each other within the jacket, a hot spot results during end use. The existence of hot spots along the length of an optical conduit is undesirable.

Another alternate extrusion process found to yield a finish jacket clad core optical conduit involves the co-extrusion of the fluoropolymer cladding inside of the finish jacket prior to formation of the core, as discussed in more detail above. The polymeric core material is then formed by filling the volume inside of the co-extruded clad with a chosen monomer mixture and the monomer mixture is then polymerized inside of the clad in a conventional manner. This method is the least desirable of the extrusion methods because the core often shrinks during polymerization and results in production of undesirable air gaps. Also this method is limited to production of maximum lengths of the manufacturing/finish jacket clad conduit of approximately 40 feet when finish jacket material of shore hardness of 80 or more on the A scale is used.

Miscellaneous Alternate Methods of Manufacture

Each of the other alternate methods of manufacture including casting; gluing two longitudinal halves; wrapping; hot bath or layering; cold spray; and heat shrink were either tested or considered extensively but were determined to be undesirable for a number of reasons. The heat shrink technique (heat shrink a finish jacket over the base optical fiber) was found to produce usable results but was not a practical method of manufacture because of the relatively high costs of materials and of labor and because the finished product lengths were very limited.

Summary Of The Preferred Process

In summary, the preferred overall processing steps used to produce the finish jacket optical conduit of the present invention preliminarily include reaction of a thermoset core material within a fluoropolymer cladding. This reaction may take place either with or without the aide of a conventional or co-extrusion type manufacturing jacket as described above. After polymerization and curing of the core material are complete, the manufacturing jacket is removed, preferably, if a manufacturing jacket was used. If greater than approximately 40 to 68-foot lengths of finished product are desired, a number of lengths of polymerized clad core are spliced together and rolled onto a spool to achieve a total length of base as desired. Then the spooled core base is extruded with a polymer such as acrylic, polycarbonate, polyvinyl chloride or silicone using conventional extrusion equipment operated at temperatures and conditions recommended for the polymer chosen to form a finish jacket over the base.

When the fluoropolymer cladding used in the core manufacturing steps is a heat-shrink fluoropolymer material, then the unshrunk clad over the cured core may be either heat shrunk automatically by virtue of heat dissipated from the molten jacketing polymer emerging from the extrusion nozzle, which has been found to be sufficient to heat shrink the fluoropolymer in extrusion of most polymer materials used for a finish jacket, or the heat shrink fluoropolymer material may be pre-shrunk prior to extrusion. The preferred method employs heat shrinking the clad material in the extruder.

Thermoplastic Core Options

As described above, some preferred embodiments of this invention employ a thermoset optical conduit core rather than a thermoplastic core. The primary reason for use of a thermoset core is that thermoset plastics are superior in resistance to high temperatures such as those generated by the source of illumination.

In this regard, the term thermoplastic refers to resins or plastic compounds which in their final state as finished articles are capable of being repeatedly softened by increases in temperature and hardened by decreases in temperature. The term thermoset refers to resins or plastic compounds which in their final state as finished articles are substantially infusible and insoluble. Thermosetting resins are often liquids at some stage in their manufacture or processing and are quite often cured by heat, catalysis or other chemical means. After being fully cured, thermoset plastics cannot be reshaped by application of heat. Some plastics which are normally thermoplastic can be made thermosetting by means of cross linking with other materials using techniques which are well known.

Because thermosetting plastics resist higher temperatures than do thermoplastic polymers, the extrusion process used in the present invention is greatly simplified when used in conjunction with a thermoset core as opposed to a thermoplastic core material.

Although the thermoset core material is the preferred core material, finish jacket optical conduit may be prepared in accordance with the present invention when using thermoplastic core materials. In this context, it is believed that relatively high temperature thermoplastic core materials and relatively low temperature finish jacket materials would produce the best thermoplastic, finish jacket optical conduit.

Advantages Of, Uses For and Options To Be Used With The Finish Jacket Optical Conduit of the Present Invention There are numerous advantages of, uses for and options to be used with the finish jacket optical conduit of the present invention. A number of these options, uses and advantages will be described as follows:

Fillers

Unlike conventional optical conduit, the finish jacket conduit of the present invention can, without greatly affecting the internal transmission of light, take advantage of various fillers such as optical brighteners; optical enhancers; particles such as micro and macro particles; microspheres; Lisa plastics (marketed by Mobay Chemicals Inc.); UV stabilizers; colorants and other fillers known to be usable in polyvinyl chloride, acrylic, polycarbonate, silicones and equivalent jacketing materials. The filler particles are mixed with the finish jacket polymer with conventional techniques and become embedded within the polymer matrix, as shown in FIG. 14. The finish jacket 38 has a number of particles 39 and the jacket 38 surrounds the clad 40 and core 41.

For example, micro dispersion particles are very small, microscopically sized particles such as phosphorescent particles commercially available under the designation P-1000 particles and available from Conrad-Hanovia. Also, metallic pigments commercially available from M.D. Both Industries are micro particles which may be used with the present invention to create a desired visual effect. Macro particles, that is relatively large particles, would include reflective aluminum and metallic polyester particles which provide color, glitter and sparkle. Such particles are available from Meadowbrook Inventions, Inc. Also, plasticized colorants of aluminum flake may be used in the present invention. Such aluminum flakes particles are commercially available from Reynolds Metals Company. Also, surface modified silicas commercially available from the FSR Chemical Division of Burns and Runell Company may be used as macro particle fillers in the present invention.

Other fillers commercially available and suitable for use in the present invention are biologically active compounds known as antimicrobials and include algacides, biocides, fungicides, and mildewcides. Examples of such antimicrobials include Vinycene (oxy-bisphenoxarsine) commercially available from Ventron Division of Morton Thiokol and Micro Chek 11 (isothiazolone) available from Ferro.

Other fillers such as defrosting or antifogging agents may be included.

Other fillers may also be included which may selectively filter certain frequencies, or absorb light of certain frequencies which are relatively useless and re-emit the same at a visible frequency which is desirable.

Ultra Violet Absorbers, Inhibitors and Blockers

Ultra violet radiation resistant chemicals may be used in conjunction with the present invention to protect the optical conduit and the finish jacket polymer from UV damage. Choice of a particular UV chemical is made according to the type of plastic to which it is added. There are numerous ultra violet absorbers, inhibitors and blockers available on the market. For example, for flexible polyvinyl chloride, Uvinyl M-40 (2-hydroxy-4-methoxy-benzophenone) made by BASF and Cyasorb UV24 (2,2-dihydroxy-4-methoxy-benzophenone) made by American Cyanamid are preferred. For use with rigid polyvinyl chloride Cyasorb UV2126

(2-hydroxy-4-acryloyloxy ethoxy-benzophenone) available from American Cyanamid and Tinuvin P (2,2-hydroxy-5-methylphenylbenzotrizode) available from Ciba/Geigy are preferred.

The degree of protection against ultra violet radiation can be varied according to the amount added to the polymer used for the finish jacket. The more UV stabilizer put into the finished jacket and the thicker the jacket, the more ultra violet radiation is prevented from radiating the core polymer material and the longer the protection lasts.

Other conventional fillers such as optical brighteners, enhancers, microspheres, colorants and Lisa plastics may also be added to achieve desired properties in the finished product.

Optional Insertions

The present invention allows an option not available in other conventional thermoset or thermoplastic linear light conduits. It allows insertions such as defrosting heater wires, reflectors, stiffeners and other items to be imbedded within the finish jacket material.

The preferred method of including imbedded materials or insertions is to place them inside the finish jacket material at the time that the finish material is being deposited upon the optical conduit using a cross head extrusion die.

Alternate Shapes

Figure 15:
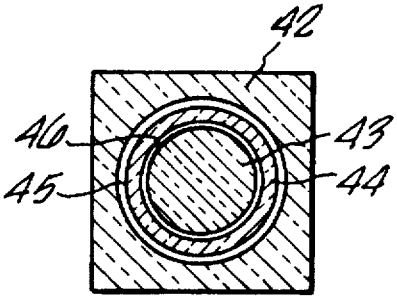
FIG. 15 is a cross-sectional view of a conduit of the present-invention illustrating an alternate cross section.
Figure 16:
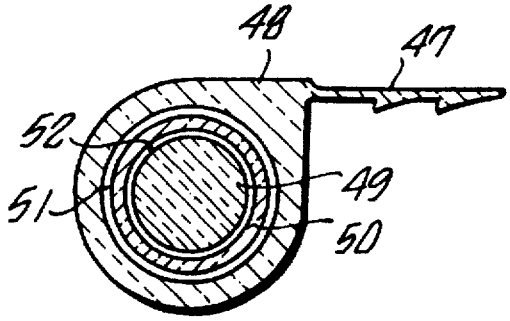
FIG. 16 is a cross-sectional view of a conduit of the present invention illustrating another alternate cross section.

Although it is believed that the most popular shape for the linear conduit of the present invention will be tubular i.e., have a circular cross-section, as shown in FIG. 14, other cross-sectional shapes, which are created by particular extrusion dies are available in accordance with the present invention. For example, referring to FIG. 11, a slightly oval cross-section is shown. In FIG. 15, a finish jacket optical conduit of the present invention having a square cross section is illustrated. Square cross section finish jacket 42 is shown surrounding the circular cross section core 43, the clad 44 and gaps 45 and 46. By appropriate choice of extrusion die, numerous finish jacket shapes such as squares, triangles, various fluted shapes, and other shapes are available. Referring to FIG. 16, a cross-sectional shape having a mounting protrusion 47 is shown incorporated in the finish jacket 48 which surrounds the core 49, and clad 50 and gaps 51 and 52. The protrusion 47 extends the entire length of the conduit and functions to aid in mounting the conduit to a backing or wall. The protrusion 47 is created simultaneously with, and is an integral part of, the finish jacket 48 during the extrusion process.

Flexible and Rigid Conduit Options

Selection of a rigid or flexible finish jacket material will depend on the requirements of the end use. The choice of particular rigid or flexible finish jacket materials to be used also depends on the end use. The properties of the finish jacket materials vary greatly, and these differences allow, in combination with various cross sectional shapes, great versatility and product capabilities.

Coupling and Bonding Options

Splicing of conventional clad optical conduit presents a number of difficulties. With presently known technology, the longest length of conventional conduit available is approximately 68 feet. There are applications where lengths longer than 68 feet are preferred, thereby requiring splicing of optical conduits. The ideal splice must be both structurally strong and aesthetically pleasing in that it must disguise or eliminate any hot spots located at the splice. Conventional splicing techniques are all relatively poor in that they are either structurally weak and/or aesthetically unacceptable. However, with use of the bondable finish jacket of the present invention, strong, aesthetically pleasing splices are achieved.

Figure 17:
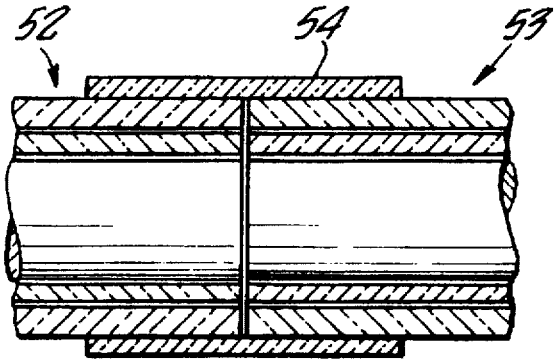
FIG. 17 is a partial cross-sectional view of a conduit splice of the present invention.
Figure 18:
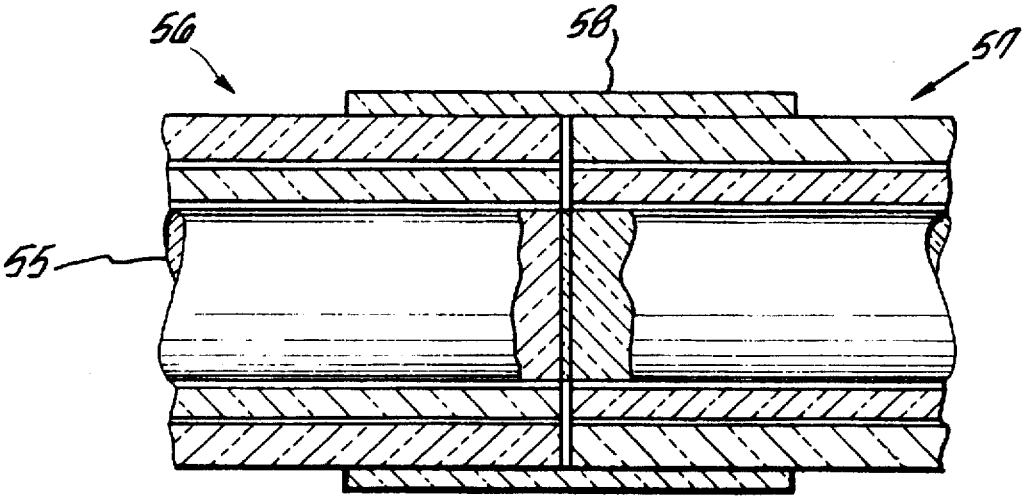
FIG. 18 is a partial cross sectional view of an alternate conduit splice of the present invention.

For example, as shown in FIG. 17, a section 52 of the finish jacket conduit of the present invention may be joined to a section 53 of this finish jacket conduit with a connector 54. The connector is preferably made of the same bondable polymer as the bondable polymer jacket, or if different jacket materials are used, the connector is made of a material bondable to each section. The connector is bonded with conventional adhesive or solvent techniques. As shown in FIG. 18, the core 55 may also be bonded together with a suitable adhesive, as described above and then the two sections 56, 57 of finish jacket optical conduit may be then spliced together with a connector 58 as described above. Connectors 54 of FIG. 17 or 58 of FIG. 18 alternatively may be of a heat shrinkable material or some other material having appropriate adhesive properties for bonding to the bondable polymer jacket sections 52, 53 or 56, 57 of FIGS. 17 or 18, respectively.

In addition to the coupling and bonding techniques described above, the finish clad conduit of the present invention can also advantageously be used with end caps, adjoining elbows and connectors. End caps having an appropriate inside diameter may be slipped over the outer jacket and adhered to the outer jacket with an appropriate solvent cement or other adhesive compatible with any bondable material chosen for the finish jacket. Various sections of finish jacket optical conduit of the present invention may be joined together with elbows and connectors in much of the same way, i.e., by simply solvent welding or gluing the elbows and/or connectors to the outer jacket, using an appropriate adhesive.

It is noted that conventional optical conduit is very difficult to splice and is very difficult to seal at the ends with end caps because of the relative lack of bondability of the fluoropolymer cladding. However, use of a bondable finish jacket of the present invention makes such splicing and bonding relatively easy. Because the bonding is not only relatively easy, but also very secure, the coupled and bonded sections are water tight, and therefore eliminate the risk of core degradation at splice points, a risk which is another problem associated with presently available optical conduit.

Sections having different colors and/or different cross sectional shapes and/or areas may be spliced together using bondable materials with the appropriate choice of coupling elbows and connections.

Multiple Optical Conduits Options

Thermoset and thermoplastic optical conduits are monofilament. Because of the small diameter of the thermoplastic optical fibers, several conduits are usually bundled together and inserted into a loose fitting jacket of transparent or translucent material in order to make visible the linear light emitting qualities of the conduit. There are applications where creating a bundle of thermoset, or a combination of thermoset and thermoplastic optical conduits are applicable. In all such applications of multiple thermoset or thermoplastic optical conduits, the finish jacketing of the present invention greatly improves the conventional methods of sheathing such multiple optical conduits.

Slit Option

It has also been discovered that a novel optical characteristic may be achieved by slitting the base core and clad prior to extruding the finish jacket over the base. When appropriately sized and placed cuts are made in the clad and optical core material of a conventional thermoset optical conduit, and the thus cut base conduit is extruded with a finish jacket of the present invention, at the point where each slit is made a bright spot appears upon illumination of the optical conduit. Such bright spots, when placed at appropriate locations in a length of conduit and when made in conjunction with an appropriate choice of finished jacket material, can function very effectively as warning or indication lighting in aisles of theatres, and other darkened areas where a signal or decorative effect is desired.

The preferred slit option uses slits cut approximately at a 45° angle from the illumination source end of the conduit and cut to, for example, on a ½ inch nominal diameter core conduit, a depth of about 3/32 inches with a dull razor blade. The depth, will, of course vary with the thickness of the core used. The preferred finish jacket for this application is a polycarbonate where a rigid product is desired. Acrylic is brittle and would create a fracture point. Silicones would be acceptable, but are relatively expensive.

Finish conduit of the present invention using the slit option yields a product similar to tube lighting but without the problems associated with tube lighting.

Unlimited Length

As mentioned previously, conventional thermoset fiber optic is available only in unspliced sections of approximately 68 feet in length. The diameters of the conduit are limited only by the availability of tubular cladding material. With the splicing techniques hereinabove described the lengths of thermoset optical conduit are now virtually unlimited.

Based on a visual inspection, it was determined that the maximum length of finish jacketed optical conduit of the present invention which will yield a good quality, uniform light of a sufficient intensity when illuminated is approximately 160 feet in length when both ends of the optical conduit of the present invention were illuminated with one ELC lamp available from General Electric Corporation at each end, set at 18.50 volts. Although the approximate maximum length is subjectively limited to 160 feet from a lighting function point of view with presently available technology, there are presently circumstances where longer continuous lengths are advantageous. Those circumstances include ease of handling, shipping, and storing.

Aura

The aura associated with the finish jacket optical conduit of the present invention is like that associated with neon lights and this aura, like that of neon lights also has the effect of making the linear light form appear to be larger than it is.

Translucent Finish Jacket Options

When translucent finish jacketing materials are used, especially when the finish jacket is etched or sanded using conventional techniques, the finish conduit, when illuminated, produces a frosted look. This frosted look also makes the emitted light have a very diffused appearance and also contributes to additionally make the light look even larger than if a smooth finish jacket is used. Using a finish jacket which has been sanded or etched hides blemishes better and thus may have increased advantages in certain applications.

Retention of Shape

Conventional thermoset optical conduit has relatively poor ability to retain a bent shape. It has been discovered that with appropriate choice of finish jacket material and bending techniques, optical conduit of the present invention can be shaped as desired and can retain the created shape. For example, when rigid polymers are used for the jacketed material, the finished product can be shaped as desired with application of heat. The shape will then be retained. In this context, the term rigid refers to those materials having a Shore hardness of about 80 and above. The term Shore hardness or indentation hardness refers to a numerical value associated with testing the hardness of a material. The hardness of a material is determined either by the size of an indentation made by an indenting tool under a fixed load or the load necessary to produce penetration of the indentor to a predetermined depth. The test usually employed for plastics is by means of a durometer such as the Shore instrument, which comprises a spring-loaded indentor point projecting through a hole in a pressure foot, and a device to show the distance this point projects beyond the base of the foot. The scale readings range from zero, for a 0.100 foot penetration up to 100, for zero penetration. Several Shore instruments are available. For example, a Shore A instrument employs a sharp indentor point with a load of 822 grams, and the Shore D instrument, typically used with very hard plastics, has a blunt pointed indentor and uses a load of 10 pounds.

It has been discovered that flexible conduit, that is, finish jacket conduit having a Shore hardness of about 80 and below can be cold or heat shaped. However, it has been discovered that when cold shaped, the material will not hold its shape and that when heat shaped, the conduit will retain some of the shape but will not retain the shape as well as the conduit having the rigid jacket.

An additional advantage of the present invention over such linear lights as neon, fluorescent, and cold cathode is that it can be reshaped repeatedly where as the other, once the shape has been set, are permanently fixed.

Bonding

It has also been discovered that because the finish jacket is capable of being made of a bondable material, the improved conduit of the present invention can be bonded to tracking or other surfaces which are also bondable. Thus, use of the present invention in these applications eliminates the need for special wire mounting attachments, such as required in neon lighting and eliminates the need for stand off components as required in other linear light forms. It is also noted that when bonded to such tracking or other surfaces, this bonding can be surface mounted or surface bonded whereas in comparison neon, especially, must be offset from the surface. It is also noted that with appropriate choice of extrusion die, the shape and form of the finished jacket, such as shown in FIG. 16 can be chosen so that it will fit, or conform to a corresponding surface of mounting tracks or other mounting devices. Also, with a square, or flat sided cross-section such as shown for example in FIG. 15, adhesive strips or tape may be placed on the back of the conduit by conventional methods to produce "ready-to-mount" sections of conduit. The lack of similar options for conventional linear light forms, such as neon, makes them very undesirable in comparison to the present invention.

Light Output

A photometer reading of a ⅝ inch diameter, green neon light on the surface of its glass envelope was 58 foot candles. A ½ inch diameter thermoset optical conduit of the present invention was also measured at its surface with the photometer. The conduit of the present invention had an acrylic finish jacket and had a ½ inch diameter core and a ⅝ inch outside diameter. The measured photometer reading was 4.725 foot candles when using an ELC lamp set at a voltage of 18.50 volts. The neon light was approximately 12.3 times brighter by photometer measurement than the optical conduit of the present invention. However, based on visual inspection, this difference did not appear to be as significant as the photometer measurements would suggest, and the neon appeared to be approximately only about 30% brighter.

When a white background was placed against the thermoset optical conduit of the present invention, the photometer reading increased to 9.37 foot candles. Thus, it appears that the brightness can be almost doubled by simply placing a white background against the finish jacket, thermoset optical conduit of the present invention.

Finish Jacket Conduit Examples

A number of samples of finish jacket thermoset optical conduit of the present invention were prepared in accordance with the description set forth above and were subjected to various tests, as will be described.

Slit Testing

Example 10

A length of conventional non-heat shrink-type fluoropolymer Teflon® FEP clad optical conduit made by Lumenyte International Corporation, nominal ½ inch active core diameter, and available as Model No. SL500, was used as the base optical conduit. After polymerization, the manufacturing jacket was removed and cuts were made in the FEP clad and the core. These cuts were slits 3/32 inches deep, measured from the outer surface of the fluoropolymer clad to the depth of the clad in the core. The slits were made at a 45 degree angle toward the light source. In other words, the deepest point of the cut, located in the core material, was the portion of the cut closest to the light source end of the optical conduit. These slits were made at a distance of ¾ inch apart from each other and were made continuously for a total length of about 20 feet. The remaining approximately 10 feet of optical conduit between the light source end and the first slit was left uncut. Thus, the total length of base optical conduit was 30 feet, 20 feet of which was slitted.

This 30 foot length of slitted base optical conduit was then tested by illuminating the finished conduit with a light source placed at the end adjacent to the 10 foot, unslitted portion of the conduit. The light source used was an ELC lamp available from General Electric, and set at 18.50 volts. Upon visual inspection of the illuminated conduit, at the location of each slit there appeared to be a bright spot. Other tests were made wherein slits were made at varying depths and varying angles in other base optical conduits. However, the 3/32 inch depth slits at the 45 degree angle produced the best results.

During observation of the Example 10 slitted conduit and other slitted conduit samples, it was noted that if the conduit was left lying on the floor, the slits tended to close up over time.

Example 11

A second 30 foot section of optical conduit was prepared exactly as the Example 10 section, except that the Example 11 section did not have slits cut in the core and clad material.

The light output from the Example 10 and Example 11 conduits were measured and compared. A photometer was placed one foot away from the slitted optical conduit of Example 10 and a measurement was taken along the conduit at the point where the slits began, nearest the light source and along the conduit to the end furthest away from the light source. The photometer readings, in foot candles, were very consistent and ranged from 5.0 foot candles to 6.0 foot candles. The readings varied between the values 5.0 and 6.0 foot candles as the meter was moved along the 20 foot length directly opposite a slit to an area opposite regions of the conduit between adjacent slits and then across the next adjacent slit. These readings may have varied slightly because the slits were made by hand, and thus were perhaps not absolutely uniform in depth and angle, in addition to variations due to the relative position of the photometer with respect to the slits as it was moved over the 20 foot section.

Photometer readings were made under the same conditions as described above, but with respect to the Example 11 conduit which was also illuminated with the ELC lamp set at 18.50 volts. With the photometer placed one foot away from the Example 11 conduit, readings were taken over the 20 feet of the 30 foot conduit which were farthest away from the light source. The photometer readings varied between 0.32 foot candles and 0.40 foot candles.

Based on the higher foot candle readings obtained from the Example 10 conduit, the slitted conduit had a measured side light output approximately 15 times that of the Example 11, non-slitted optic over the 20 foot length measured.

Example 12

In Example 12 a sample of slitted optical conduit was made with a dull razor blade compared to a relatively sharp razor blade used to make the Example 10 slitted conduit. Upon leaving the Example 12 conduit lying on the floor, it was noticed that it took a much longer time for the slits to close compared to the closing time of the Example 10 conduit. Samples took various times to close from ten to sixty minutes.

Example 13

A clad and core base conduit slit with a dull razor blade similar to that of Example 12, was extruded with polycarbonate polymer used as the finish jacket material. The Example 13 finish jacket optical conduit was left lying on the floor for about seven days and was found not to exhibit the slit closing phenomena which was associated with the Example 10 and Example 12 conduit samples. The finish jacket optical conduit of Example 13 was visibly brighter than the optical conduit of Example 11.

Example 14 (proposed)

It was observed that when circular cross section optical conduit of the present invention was made with slits as described above, the conduit tended to twist, thus resulting in a slitted conduit having the slits not located on the same side presented to a viewer. It is believed that an Example 14 finish jacket optical conduit in accordance with the present invention could be made so that it had a slight oval cross-section as illustrated in FIG. 11. This proposed Example 14, oval cross-sectioned conduit is expected not to exhibit the twisting phenomena that circular cross-sectioned conduit exhibited. In the proposed Example 14 conduit, the slits are to be placed through one of the narrow sectors of the oval and it is believed that the conduit will remain straight, so that the slits all will remain in a straight line as seen by a viewer looking directly opposite the slitted narrow edge of the proposed Example 14 conduit.

Based on the results of Examples 10 through 14, using a nominal ½ inch active core diameter optical conduit, the preferred slitted product is a thermoset optical conduit having 3/32 inch deep cuts made with a relatively dull razor blade and made at a 45° angle toward a light source end of the conduit and having a polycarbonate finish jacket extruded over the optic using a cross-head die which produces a slightly oval cross-sectional shape in the finish jacket thermoset optical conduit. This slitted product provides the maximum light output in a uniform pattern which retains the slits and its shape over time. The depth of the cuts will vary with the diameter of the optical conduit, the larger the diameter, the deeper the cuts.

Heat Bending

Several finish jacket optical conduit samples were prepared in accordance with the present invention as described above and were tested to determine the heat bending properties of the conduit.

Example 15

A sample of the conduit of the present invention having an acrylic finish jacket was prepared and heated with an acetylene torch and the heated conduit was then formed into various shapes.

Example 16

A sample of conduit identical to that of Example 15 was prepared and was heated with a paint stripper gun prior to forming the conduit into various shapes.

The acetylene torch method of Example 15 was much more difficult to work with than was the method of Example 16. The acetylene torch tended to heat the acrylic jacket very quickly and caused blisters to form on the surface of the acrylic finish jacket. Also, the Example 15 sample tended to kink when bending while it was still hot.

The paint stripper gun method of Example 16 yielded a much better finished product and is preferred. A paint stripping gun, rated at 1300 watts, was held approximately one inch from the acrylic jacket and moved back and forth across the surface of the jacket until the acrylic jacket softened. The thus softened conduit could be formed into various shapes without shrinking or blistering on the surface. It was noted that if the paint stripper gun was held in one position one inch away from the acrylic jacket surface for approximate 23 seconds, blisters did appear. It was also discovered that conduit of the present invention having an acrylic finish jacket can be heated to approximately 200° F. degrees for about 7 to 10 minutes in an ordinary oven and then bent into various shapes such as letters, curves, etc. and after cooling the conduit will retain its bend shape. The oven heating method is also preferred.

Example 17

The Examples 15 and 16 optical conduits were made from a ¼ inch core diameter optical base conduit clad with conventional cladding and were extruded with acrylic polymer to form 0.400 inch outer diameter acrylic finished jacket. It was found that finish jacket optical conduit heat-bent in accordance with the Example 16 procedure using a paint stripping gun could be bent 180° degrees with an approximately ¼ inch turning radius with no kinking being observed at the bend. Upon illumination of the thus bent conduit, the light transmitted out of the conduit at the bend appeared to be only slightly brighter than the light emitted along the straight portion. This result is considered to be very favorable compared to light transmission at bends in other thermoset optical conduit. Conventional optical conduit either cannot be bent to this extent at all, or if it can be bent to this extent, exhibits very noticeable bright spots at the regions of sharp bends.

Example 18

Also using the paint stripper gun method of Example 16, another acrylic finish jacket optical conduit was formed into a three dimensional shape having 13 bends and the overall appearance was that of an illuminated optical form having relatively even light transmission and having an appearance very similar to that of a neon light, including an aura.

Examples 19–22

Examples 19–22 were made as in Examples 15–18, respectively, except that the finish jacket was polycarbonate. The Examples 19–22 conduits appeared to differ only in that it took longer to heat the conduits to a point where they could be bent.

Ultra Violet Radiation Resistance Testing

Thermoset optical conduit of the present invention was tested for ability to resist degradation due to ultra violet radiation.

Example 23

A six foot section of acrylic finish jacket, thermoset optical conduit was prepared in accordance with the method set forth above. The acrylic jacket was removed on three feet of the six foot length of finished optical conduit. This six foot long section was then placed in direct sunlight for a period of ten days. After ten days of exposure to sunlight, the sample was tested for light transmission ability and was visually examined. The three feet of the Example 23 section which did not have the acrylic sheathing was reddish/yellow in appearance and exhibited very poor light transmission capability compared to that portion which had the acrylic jacket surrounding the core and clad base. The three foot section having the acrylic jacket left in place exhibited no change in light transmission properties compared to an identical jacketed conduit which had been kept out of the sunlight. Also the core material in this section was clear in color, although the acrylic jacket exhibited slight discoloration.

Freeze Test—Example 24

A section of acrylic finish jacket thermoset conduit in accordance with the present invention was placed in a deep freeze for two weeks at a temperature of −10° C. After removing the Example 23 sample from the freezer, frost immediately appeared on the outer surface of the conduit. The conduit was illuminated with an ELC lamp set at 18.50 volts and it exhibited light transmission characteristics virtually identical to that of a sample which had not been placed in the freezer. Upon visual inspection of the Example 24 conduit after the frost had disappeared, there was no apparent change observed.

Comparison Tables I and II

An eight foot long section of acrylic finish jacket thermoset optical conduit clad with conventional, non heat-shrink FEP Teflon® fluoropolymer clad was prepared in accordance with the present invention and was compared to eight foot long sections of conventional linear lighting forms including 30 mil neon, cold cathode, reflective fluorescent rod and conventional thermoset and thermoplastic conduit. Shown below in Table I are comparisons of conventional linear lights to the finish jacket conduit of the present invention as a standard regarding such features as brightness, aura, shape retention, cross section options, fragility, electrical hazard potential, bondability, waterproof splicing, color change and reshaping.

TABLE I

Linear Lights Comparison

| Feature | Thermoset Conduit with Acrylic Jacket (with non-heat-shrink fluoro-polymer clad) | 30 Mil Neon | Cold Cathode | Reflective Fluorescent Rod |
|---|---|---|---|---|
| Brightness | Standard | Brighter | Brighter | Dimmer |
| Aura | Yes | Equal | None | None |
| Shape Retention | Yes | Equal | Equal | Equal |
| Jacket Cross Section Options | Any Shape that can be Extruded | Limited to Round | Limited to Round | Any Shape that can be Extruded |
| Fragility | Standard | Much More Fragile | Much More Fragile | Equal |
| Electrical Hazard Potential | None | Much More Dangerous | Much More Dangerous | Equal |
| Bondability | Yes | No | No | Yes |
| Waterproof Splicing | Yes | No | No | Yes |
| Color Change | Yes | No | No | No |
| Reshaping | Yes | No | No | Yes |

Shown below in Table II of conventional linear optical conduit and heat shrink type clad conduit as described above are compared to the finish jacketed conduit of the present invention, including a non-heat shrink clad base.

TABLE II

Linear Conduits Comparison

| Feature | Thermoset Conduit w/ Acrylic Jacket (with non-(heat shrink fluoro-polymer clad) | Thermoset Conduit (heat shrink fluoro-polymer clad) | Thermoset Conduit (non-heat-shrink fluoro-polymer clad) | Thermo-plastic Conduit (non-heat-shrink fluoro-polymer clad) |
|---|---|---|---|---|
| Brightness | Standard | Brighter | Equal | Dimmer |
| Aura | Yes | Less | Less | None |
| Shape Retention | Yes | None | None | None |
| Jacket Cross Section Options | Any Shape that can be Extruded | Symme-trical | Symme-trical | Circular |
| Fragility | Standard | Less Fragile | Less Fragile | Less Fragile |
| Electrical Hazard Potential | None | Equal | Equal | Equal |
| Bondability | Standard | No | No | No |

TABLE II-continued

Linear Conduits Comparison

| Feature | Thermoset Conduit w/ Acrylic Jacket (with non-(heat shrink fluoro-polymer clad) | Thermoset Conduit (heat shrink fluoro-polymer clad) | Thermoset Conduit (non-heat-shrink fluoro-polymer clad) | Thermo-plastic Conduit (non-heat-shrink fluoro-polymer clad) |
|---|---|---|---|---|
| Waterproof Splicing | Standard | No | No | No |
| Color Change | Yes | Yes | Yes | Yes |
| Reshaping | Yes | Yes | Yes | Yes |

The neon, cold cathode and reflective fluorescent rod are all linear lights. The thermoplastic conduit and the thermoset conduit are linear optical conduits. Each of the light forms compared was an eight foot length of generally tubular shape. Each of the conduits used as a light source an ELC lamp available from General Electric, and set at 18.50 volts. The eight foot section of acrylic finish jacket thermoset optical conduit of the present invention was used as the standard, and thus column I of Tables I and Table II use the phrase "standard" where applicable. In regard to the brightness comparison, the brightness of the other light forms were compared to the brightness of the eight foot long section of the present invention conduit and it was found that the reflective fluorescent rod and the thermoplastic conduit were dimmer but that the neon and cold cathode lights were brighter. In regard to the fragility comparison, an acrylic finish jacket was compared to the glass enclosures of the 30 mil neon and cold cathode linear lights in Table I and to the flexible fluoropolymer cladding of the thermoset and thermoplastic conduits in Table II. The acrylic finish jacket conduit of the present invention was less fragile than the glass enclosured linear lights in Table I. The flexible fluoropolymer clad thermoset and thermoplastic conduits of Table II were less fragile than the acrylic finish jacketed conduit of the present invention. However, polycarbonate and polyvinyl chloride finish jacket conduit of the present invention were each less fragile than the glass linear lights of Table I and less fragile than the thermoset and thermoplastic fluoropolymer clad conduits of Table II.

Based on the information set forth in the comparison chart, it is apparent that none of the conventional linear light forms or even the non-jacketed, heat-shrink type clad core conduct as described above exhibit all of the advantageous qualities of the present invention finish jacketed linear light form. The linear light form of the present invention is bright, has an aura, will hold its shape after forming, has the option of virtually any cross sectional shape, is generally not fragile, has virtually no electrical hazards, is bondable, and is field spliceable in comparison to other known linear light forms. None of the other linear light forms, whether conduit or light, is capable of all of the characteristics of the present invention, as described above.

Comparison Between Finish Jacketed Conduit Having a Heat-Shrink Base Compared to Conduit Having a Non-Heat-Shrink Base, Examples 25 and 26

Comparisons were made between the finish jacketed conduit of the present invention -using conventional thermoset non-heat shrink clad optical conduit and thermoset optical conduit using the heat shrink concept as the base as set forth above.

Comparing equal eight foot lengths of the conduit of the present invention made from thermoset optical conduit having a non-heat shrink FEP Teflon® fluoropolymer clad as a base, Example 25 and made from thermoset optical conduit having a heat-shrink FEP Teflon® fluoropolymer clad as a base, Example 26, each otherwise being alike, the finish jacketed heat-shrink clad thermoset optical conduit of the present invention appeared to be about 15% brighter than the non-heat shrink FEP Teflon® fluoropolymer clad thermoset optical conduit of the present invention, and substantially more uniform linear distribution of light was emitted along the length of the heat-shrink clad based optical conduit. Otherwise, Examples 25 and 26 appeared to be the same. The finish jacket of the present invention was transparent polycarbonate polymer in both of Examples 25 and 26.

The above examples, comparisons, and methods are set forth to illustrate preferred embodiments of the invention. It is envisioned that one skilled in this art could readily make alternate embodiments and devise alternate processes for manufacturing the heat shrink type clad conduit and the finish jacketed conduit of the present invention. It is not intended that the scope of the invention be limited to the examples disclosed herein, but rather is limited only to that set forth in the appended claims and equivalents thereof.

We claim:

1. A method of making a linear light conduit comprising the steps of:

selecting a length of light transmitting monofilament core surrounded with an expanded, heat shrinkable fluoropolymer cladding as a base conduit;

selecting a polymer as a finish jacket material; and extruding the polymer over the length of base conduit at a temperature sufficient to shrink the heat shrinkable cladding and to form a finish jacket optical conduit.

2. A method of making a linear light conduit comprising the steps of:

selecting a plurality of lengths of light transmitting monofilament cores each surrounded with an expanded, heat shrinkable fluoropolymer cladding;

splicing the plurality of lengths to each other to form a single length of spliced base conduit;

selecting a polymer as a finish jacket material; and extruding the polymer over the single length of spliced base conduit at a temperature sufficient to shrink the heat shrinkable cladding.

3. The method of claim 1 or 2 wherein the monofilament core is a thermoset optical polymer.

4. The method of claim 1 or 2 wherein the polymer is selected from the group consisting essentially of acrylic, polycarbonate, polyvinyl chloride and silicone.

5. The process of making a flexible, clad monofilament linear light conduit comprising the steps of:

selecting a tubular heat shrink fluoropolymer cladding having a pre-expanded first inner diameter which is less than an ultimate outer diameter of a flexible cylindrical core, and said cladding having been expanded so that it has a second inner diameter greater than the ultimate outer diameter of the core;

extruding over the expanded cladding, a manufacturing jacket consisting essentially of a low extrusion temperature polymer and at a temperature which is less than that required to effectuate shrinkage of the heat shrink clad;

placing a polymerizable monomer mixture inside the cladding;

polymerizing the mixture to form the flexible cylindrical core;

removing the jacket; and applying heat to the cladding effective to shrink the cladding around the outer periphery of the core.

6. The process of claim 5 wherein the low extrusion temperature polymer is poly(vinyl acetate).

7. The process of claim 5 wherein the low extrusion temperature polymer is a co-polymer.

8. The process of claim 7 wherein the co-polymer is ethylene-vinyl acetate co-polymer.

9. The process of making a flexible, clad monofilament linear light conduit comprising the steps of:

selecting a tubular heat shrink fluoropolymer cladding having a pre-expanded first inner diameter which is less than a final outer diameter of a flexible cylindrical core, and said cladding having been expanded so that it has a second inner diameter greater than the predetermined outer diameter of the core;

pressurizing the inside of the cladding above the pressure outside the cladding to establish a pressure differential;

maintaining the pressure differential;

extruding over the expanded cladding a manufacturing jacket consisting essentially of a low extrusion temperature polymer and at a temperature which is less than that required to effectuate shrinkage of the heat shrink cladding.

placing a polymerizable monomer mixture inside the cladding;

polymerizing the mixture to form the flexible core;

removing the jacket; and applying heat to the cladding effective to shrink the cladding around the outer periphery of the core.

10. The process of claim 9 wherein the internal pressure of the cladding is maintained at about 40 to 100 pounds per square inch above the external pressure around the cladding.

11. The process of claim 9 or 10 wherein the low extrusion temperature polymer is poly(vinyl acetate).

12. The process of claim 9 or 10 wherein the low extrusion temperature polymer is poly(ethylene).

13. The process of claim 9 or 10 wherein the low extrusion temperature polymer is a co-polymer.

14. The process of claim 9 or 10 wherein the polymer is ethylene-vinyl acetate co-polymer.

15. The process of making a flexible, clad monofilament linear light conduit comprising the steps of:

selecting a tubular heat shrink fluoropolymer cladding having a pre-expanded first inner diameter which is less than an ultimate outer diameter of a flexible cylindrical core, and said cladding having been expanded so that it has a second diameter greater than the ultimate outer diameter of the core;

extruding over the expanded cladding a manufacturing jacket consisting essentially of a low extrusion temperature polymeric material which extrudes at a temperature which is less than that which would cause the heat shrink clad to shrink to a third diameter equal to or less than the ultimate outer diameter of the core;

placing a polymerizable monomer mixture inside the cladding;

polymerizing the mixture to form the flexible core;

removing the jacket; and applying heat to the cladding effective to shrink the cladding to a third diameter and effective to relatively and uniformly minimize any gap between the outer periphery of the core and the inner periphery of the cladding.

16. The process of claim 15 wherein the low extrusion temperature polymer is poly(vinyl acetate).

17. The process of claim 15 wherein the first inner diameter of the heat shrink clad is about ninety percent or less of the ultimate outer diameter of the core.

18. The process of claim 15 wherein the low extrusion temperature polymer is a co-polymer.

19. The process of claim 18 wherein the co-polymer is ethylene-vinyl acetate co-polymer.

20. The process of making a flexible, clad monofilament linear light conduit comprising the steps of:

selecting a tubular heat shrink fluoropolymer cladding having a pre-expanded first inner diameter which is less than a ultimate diameter of a flexible cylindrical core, and said cladding having been expanded so that it has a second diameter greater than the ultimate outer diameter of the core;

pressurizing and maintaining pressure inside of the cladding, in an expanded form, at a pressure sufficient to prevent shrinkage during an extrusion process to a third diameter which is equal to or less than the ultimate outer diameter of the core;

while maintaining the pressure inside the cladding, extruding over the cladding a manufacturing jacket consisting essentially of a low extrusion temperature polymer material which will extrude at a temperature which is high enough to cause shrinking the heat shrink cladding, said pressure inside the cladding preventing said shrinking;

placing a polymerizable monomer mixture inside the cladding;

polymerizing the mixture to form the flexible core;

removing the jacket; and applying heat to the cladding effective to shrink the cladding around the third diameter and effective to relatively and uniformly minimize any gap which may exist between the outer periphery of the core, and the inner periphery of the cladding.

21. The process of claim 20 wherein the pressure inside of the cladding is maintained at about 40 to 100 pounds per square inch.

22. The process of claim 20 or 21 where the low extrusion temperature polymer is poly(vinyl acetate).

23. The process of claim 20 or 21 where the low extrusion temperature polymer is poly(ethylene).

24. The process of claim 20 or 21 wherein the inner first diameter of the cladding is about ninety percent or less than the ultimate outer diameter of the core.

25. The process of claim 20 or 21 wherein the low extrusion temperature polymer is a co-polymer.

26. The process of claim 25 wherein the co-polymer is ethylene-vinyl acetate co-polymer.

*27. The process of making a jacketed linear light conduit comprising the steps of:*

*selecting a clad, optical conduit having a light-transmitting core and a fluoropolymeric cladding; and*

*extruding over aid conduit a transparent or translucent polymeric jacket.*

*28. The process of claim 27 further comprising the steps of:*

*selecting said clad, optical conduit to have a combined diameter of about 0.50 inches; and*

*extruding over said conduit said transparent or translucent polymeric jacket to provide for an inner diameter no greater than 0.05 inches greater than the outer diameter of said cladding.*

*29. The process of claim 27 further comprising the steps of:*

*selecting said clad, optical conduit to have a combined diameter of about 0.125 inches; and*

*extruding over said conduit said transparent or translucent polymeric jacket to provide for an inner diameter no greater than 0.025 inches greater than the outer diameter of said cladding.*

*30. The process of claim 27 further comprising the steps of:*

*extruding over said conduit said transparent or translucent polymeric jacket to provide for a wall thickness in the range of about 0.010 inches to about 0.50 inches.*

*31. The process of claim 27 further comprising the steps of:*

*extruding over said conduit said transparent or translucent polymeric jacket to provide for a wall thickness in the range of about 0.010 inches to about 0.3875 inches.*

*32. The process of claim 27 further including the step of etching or sanding said jacket.*

*33. A method of making a jacketed linear light conduit comprising the steps of:*

*selecting a length of a monofilament, light transmitting core selected from the group consisting essentially of thermoplastic or thermoset polymers of a first refractive index surrounded by a clad having a second refractive index which is lower than said first refractive index as a base conduit;*

*selecting a light transmitting polymer as a finish jacket; and*

*extruding said polymer over said length of said base conduit.*

*34. A method of making a jacketed linear light conduit comprising the steps of:*

*selecting a length of a liquid, monofilament light transmitting core of a first refractive index surrounded by a clad having a second refractive index lower than said first refractive index as a base conduit;*

*selecting a light transmitting polymer as a finish jacket; and*

*extruding said polymer over said length of said base conduit to form a finish jacket optical conduit capable of emitting light circumferentially transverse to said conduit length.*

*35. A method of making a jacketed linear light conduit comprising the steps of:*

*selecting a plurality of light transmitting cores selected from the group consisting essentially of thermoplastic or thermoset polymer of a first refractive index surrounded by a clad having a second refractive index lower than said first refractive index as a base conduit;*

*selecting a light transmitting polymer as a finish jacket; and*

*extruding said polymer over said plurality to form a finish jacket optical conduit capable of emitting light circumferentially transverse to said conduit.*

*36. A method of making a jacketed linear light conduit comprising the steps of:*

*selecting a plurality of lengths of light transmitting cores selected from the group consisting essentially of thermoplastic or thermoset polymers of a first refractive*

*index surrounded by a clad having a second refractive index lower than said first refractive index;*

*splicing said lengths of cores to form a base conduit;*

*selecting a light transmitting polymer as a finish jacket; and*

*extruding said polymer over said base conduit.*

*37. The process of any of claims 27, 33, 34, 35 or 36 in which the extruding step is performed so as to minimize any gap between the outside of said cladding and the inside of said jacket.*

*38. The process of making a jacketed linear light conduit comprising the steps of:*

*selecting a linear light conduit having a light transmitting core and a fluoropolymeric cladding; and*

*extruding over said conduit a transparent or translucent polymeric jacket to provide for an aura upon transmission of light therethrough said conduit.*

*39. The process of making a jacketed linear light conduit comprising the steps of:*

*selecting a linear light conduit having a light transmitting core and a heat shrinkable clad extending over the length of the core;*

*shrinking the heat shrinkable clad; and*

*extruding over said conduit a transparent or translucent polymeric jacket.*

*40. The process of making a jacketed linear light conduit comprising the steps of:*

*selecting a linear light conduit having a light transmitting core and a fluoropolymeric cladding;*

*placing over the entire length of said conduit a heat shrinkable transparent or translucent polymeric jacket; and*

*shrinking said jacket to form said jacketed conduit.*

*41. The process of making a jacketed linear light conduit comprising the steps of:*

*selecting a linear light conduit having a light transmitting core and a fluoropolymeric cladding; and*

*extruding over said conduit a transparent or translucent polymeric jacket having a Shore hardness of at least about 80.*

*42. The process of claim 41 further including the step of shaping said jacketed linear light conduit to a predetermined shape.*

*43. The process of making a jacketed linear light conduit comprising the steps of:*

*selecting a first linear light conduit having a light transmitting core and a fluoropolymeric cladding;*

*selecting a second linear light conduit having a light transmitting core and a fluoropolymeric cladding;*

*splicing the first conduit to the second conduit to form a base conduit; and*

*extruding over said base conduit a transparent or translucent polymeric jacket.*

*44. The process of making a jacketed linear light conduit comprising the steps of:*

*selecting a linear light base conduit having a light transmitting core and a fluoropolymeric cladding having a diameter no greater than 0.50 inches; and*

*extruding over said conduit a transparent or translucent polymeric jacket having an inner diameter no greater than 0.05 inches greater than the outer diameter of said cladding.*

*45. The process of making a jacketed linear light conduit comprising the steps of:*

*selecting a linear light base conduit having a light transmitting core and a fluoropolymeric cladding having a diameter no greater than 0.125 inches; and*

*extruding over said conduit a transparent or translucent polymeric jacket having an inner diameter no greater than 0.025 inches greater than the outer diameter of said cladding.*

* * * * *